(12) United States Patent
Courbage et al.

(10) Patent No.: US 9,619,579 B1
(45) Date of Patent: *Apr. 11, 2017

(54) SYSTEM AND METHOD FOR PROVIDING AN AGGREGATION TOOL

(71) Applicant: EXPERIAN INFORMATION SOLUTIONS, INC., Costa Mesa, CA (US)

(72) Inventors: Magali Courbage, Richardson, TX (US); Richard Rodenbusch, Allen, TX (US); Jean-Dominique Morani, Irving, TX (US)

(73) Assignee: EXPERIAN INFORMATION SOLUTIONS, INC., Costa Mesa, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/091,174

(22) Filed: Nov. 26, 2013

Related U.S. Application Data

(63) Continuation of application No. 12/022,954, filed on Jan. 30, 2008, now Pat. No. 8,606,666.

(Continued)

(51) Int. Cl.
*G06Q 40/00* (2012.01)
*G06F 17/30* (2006.01)
(Continued)

(52) U.S. Cl.
CPC .......... *G06F 17/30943* (2013.01); *G06F 1/00* (2013.01); *G06F 11/07* (2013.01); *G06F 11/22* (2013.01)

(58) Field of Classification Search
USPC .. 705/34, 39, 37, 38, 42, 26, 14, 40, 50, 10; 707/748, 737, 706, 708; 715/726;
(Continued)

(56) References Cited

U.S. PATENT DOCUMENTS

| 4,812,628 | A | 3/1989 | Boston et al. |
| 4,827,508 | A | 5/1989 | Shear |

(Continued)

FOREIGN PATENT DOCUMENTS

| EP | 0 419 889 | 4/1991 |
| EP | 0 458 698 | 11/1991 |

(Continued)

OTHER PUBLICATIONS

U.S. Appl. No. 12/705,489, Feb. 12, 2010, Bargoli et al.

(Continued)

*Primary Examiner* — Tien Nguyen
(74) *Attorney, Agent, or Firm* — Knobbe Martens Olson & Bear LLP

(57) ABSTRACT

Embodiments of the present invention assist in the development, management, and deployment of aggregated data attributes for multiple data sources. One embodiment provides a development interface that allows for elements of attributes, including filters, to be moved into a coding area in which an attribute or an attribute element is being edited. In another embodiment, the user interface presents data fields to assist in the development of filters for multiple data sources with divergent formats. The application further provides a validation interface through which users can validate attributes and trace the results returned by various elements referenced by the attributes under validation. Another embodiment provides a system for managing attributes and deploying them to various systems by creating a deployment file that is used by an attribute calculation system. In one embodiment, the attribute calculation system is a scalable system that dynamically calculates attributes for multiple data sources.

20 Claims, 17 Drawing Sheets

Related U.S. Application Data

(60) Provisional application No. 60/887,523, filed on Jan. 31, 2007.

(51) Int. Cl.
  *G06F 1/00* (2006.01)
  *G06F 11/07* (2006.01)
  *G06F 11/22* (2006.01)

(58) Field of Classification Search
  USPC .................. 709/217; 713/162; 706/15, 45
  See application file for complete search history.

(56) References Cited

U.S. PATENT DOCUMENTS

| | | | |
|---|---|---|---|
| 4,868,570 A | 9/1989 | Davis | |
| 4,935,870 A | 6/1990 | Burk, Jr. et al. | |
| 4,947,028 A | 8/1990 | Gorog | |
| 5,201,010 A | 4/1993 | Deaton et al. | |
| 5,216,612 A | 6/1993 | Cornett et al. | |
| 5,247,575 A | 9/1993 | Sprague et al. | |
| 5,325,509 A | 6/1994 | Lautzenheiser | |
| 5,341,429 A | 8/1994 | Stringer et al. | |
| 5,528,701 A | 6/1996 | Aref | |
| 5,555,409 A | 9/1996 | Leenstra, Sr. et al. | |
| 5,590,038 A | 12/1996 | Pitroda | |
| 5,621,201 A | 4/1997 | Langhans et al. | |
| 5,630,070 A | 5/1997 | Dietrich et al. | |
| 5,640,551 A | 6/1997 | Chu et al. | |
| 5,640,577 A | 6/1997 | Scharmer | |
| 5,655,129 A | 8/1997 | Ito | |
| 5,659,731 A | 8/1997 | Gustafson | |
| 5,666,528 A | 9/1997 | Thai | |
| 5,692,107 A | 11/1997 | Simoudis et al. | |
| 5,737,732 A | 4/1998 | Gibson et al. | |
| 5,748,098 A | 5/1998 | Grace | |
| 5,765,143 A | 6/1998 | Sheldon et al. | |
| 5,768,423 A | 6/1998 | Aref et al. | |
| 5,774,692 A | 6/1998 | Boyer et al. | |
| 5,778,405 A | 7/1998 | Ogawa | |
| 5,797,136 A | 8/1998 | Boyer et al. | |
| 5,812,840 A | 9/1998 | Shwartz | |
| 5,822,750 A | 10/1998 | Jou et al. | |
| 5,822,751 A | 10/1998 | Gray et al. | |
| 5,825,884 A | 10/1998 | Zdepski et al. | |
| 5,832,068 A | 11/1998 | Smith | |
| 5,835,915 A * | 11/1998 | Carr ................... | G06F 11/1458 707/999.201 |
| 5,844,218 A | 12/1998 | Kawan et al. | |
| 5,881,131 A | 3/1999 | Farris et al. | |
| 5,884,287 A | 3/1999 | Edesess | |
| 5,893,090 A | 4/1999 | Friedman et al. | |
| 5,905,985 A | 5/1999 | Malloy et al. | |
| 5,930,776 A | 7/1999 | Dykstra et al. | |
| 5,940,812 A | 8/1999 | Tengel et al. | |
| 5,956,693 A | 9/1999 | Geerlings | |
| 5,963,932 A | 10/1999 | Jakobsson et al. | |
| 6,038,551 A | 3/2000 | Barlow et al. | |
| 6,070,147 A | 5/2000 | Harms et al. | |
| 6,073,140 A | 6/2000 | Morgan et al. | |
| 6,121,901 A | 9/2000 | Welch et al. | |
| 6,128,602 A | 10/2000 | Northington et al. | |
| 6,128,624 A | 10/2000 | Papierniak et al. | |
| 6,144,957 A | 11/2000 | Cohen et al. | |
| 6,151,601 A | 11/2000 | Papierniak et al. | |
| 6,157,927 A | 12/2000 | Schaefer et al. | |
| 6,185,543 B1 | 2/2001 | Galperin et al. | |
| 6,208,979 B1 | 3/2001 | Sinclair | |
| 6,223,171 B1 * | 4/2001 | Chaudhuri .......... | G06F 11/3447 707/718 |
| 6,236,977 B1 | 5/2001 | Verba et al. | |
| 6,256,630 B1 | 7/2001 | Gilai et al. | |
| 6,263,334 B1 | 7/2001 | Fayyad et al. | |
| 6,263,337 B1 | 7/2001 | Fayyad et al. | |
| 6,304,869 B1 | 10/2001 | Moore et al. | |
| 6,311,169 B2 | 10/2001 | Duhon | |
| 6,339,769 B1 | 1/2002 | Cochrane et al. | |
| 6,366,903 B1 | 4/2002 | Agrawal et al. | |
| 6,393,406 B1 | 5/2002 | Eder | |
| 6,405,173 B1 | 6/2002 | Honarvar | |
| 6,446,200 B1 | 9/2002 | Ball et al. | |
| 6,457,012 B1 | 9/2002 | Jatkowski | |
| 6,496,819 B1 | 12/2002 | Bello et al. | |
| 6,505,168 B1 | 1/2003 | Rothman et al. | |
| 6,513,018 B1 | 1/2003 | Culhane | |
| 6,523,022 B1 | 2/2003 | Hobbs | |
| 6,523,041 B1 | 2/2003 | Morgan et al. | |
| 6,574,623 B1 | 6/2003 | Leung et al. | |
| 6,601,234 B1 * | 7/2003 | Bowman-Amuah ..... | G06F 8/24 705/7.37 |
| 6,611,816 B2 | 8/2003 | Lebda et al. | |
| 6,651,220 B1 | 11/2003 | Penteroudakis et al. | |
| 6,708,166 B1 | 3/2004 | Dysart et al. | |
| 6,714,944 B1 | 3/2004 | Shapiro et al. | |
| 6,738,748 B2 | 5/2004 | Wetzer | |
| 6,748,426 B1 | 6/2004 | Shaffer et al. | |
| 6,766,327 B2 | 7/2004 | Morgan, Jr. et al. | |
| 6,804,346 B1 | 10/2004 | Mewhinney | |
| 6,804,701 B2 | 10/2004 | Muret et al. | |
| 6,850,895 B2 | 2/2005 | Brodersen et al. | |
| 6,865,566 B2 | 3/2005 | Serrano-Morales et al. | |
| 6,910,624 B1 | 6/2005 | Natsuno | |
| 6,934,714 B2 | 8/2005 | Meinig | |
| 6,954,757 B2 | 10/2005 | Zargham et al. | |
| 6,959,281 B1 | 10/2005 | Freeling et al. | |
| 6,965,889 B2 | 11/2005 | Serrano-Morales et al. | |
| 6,983,379 B1 | 1/2006 | Spalink et al. | |
| 6,983,478 B1 | 1/2006 | Grauch et al. | |
| 6,985,887 B1 | 1/2006 | Sunstein et al. | |
| 7,003,504 B1 * | 2/2006 | Angus ............... | G06F 17/30563 |
| 7,028,001 B1 | 4/2006 | Muthuswamy et al. | |
| 7,028,052 B2 | 4/2006 | Chapman et al. | |
| 7,035,855 B1 | 4/2006 | Kilger et al. | |
| 7,039,176 B2 | 5/2006 | Borodow et al. | |
| 7,047,251 B2 | 5/2006 | Reed et al. | |
| 7,050,989 B1 | 5/2006 | Hurt et al. | |
| 7,076,475 B2 | 7/2006 | Honarvar | |
| 7,082,435 B1 | 7/2006 | Guzman et al. | |
| 7,133,935 B2 | 11/2006 | Hedy | |
| 7,152,053 B2 | 12/2006 | Serrano-Morales et al. | |
| 7,167,907 B2 | 1/2007 | Shaffer et al. | |
| 7,184,974 B2 | 2/2007 | Shishido | |
| 7,185,016 B1 | 2/2007 | Rasmussen | |
| 7,188,169 B2 | 3/2007 | Buus et al. | |
| 7,200,602 B2 | 4/2007 | Jonas | |
| 7,240,059 B2 | 7/2007 | Bayliss et al. | |
| 7,249,048 B1 | 7/2007 | O'Flaherty | |
| 7,263,506 B2 | 8/2007 | Lee et al. | |
| 7,272,591 B1 | 9/2007 | Ghazal et al. | |
| 7,275,083 B1 | 9/2007 | Seibel et al. | |
| 7,277,875 B2 | 10/2007 | Serrano-Morales et al. | |
| 7,277,900 B1 | 10/2007 | Ganesh et al. | |
| 7,367,011 B2 | 4/2008 | Ramsey et al. | |
| 7,370,044 B2 | 5/2008 | Mulhern et al. | |
| 7,376,603 B1 | 5/2008 | Mayr et al. | |
| 7,383,215 B1 | 6/2008 | Navarro et al. | |
| 7,403,942 B1 | 7/2008 | Bayliss | |
| 7,421,322 B1 | 9/2008 | Silversmith et al. | |
| 7,421,442 B2 | 9/2008 | Gelb et al. | |
| 7,433,864 B2 | 10/2008 | Malik | |
| 7,451,113 B1 | 11/2008 | Kasower | |
| 7,467,127 B1 | 12/2008 | Baccash et al. | |
| 7,472,088 B2 | 12/2008 | Taylor et al. | |
| 7,475,118 B2 | 1/2009 | Leiba et al. | |
| 7,483,842 B1 | 1/2009 | Fung et al. | |
| 7,505,938 B2 | 3/2009 | Lang et al. | |
| 7,529,698 B2 | 5/2009 | Joao | |
| 7,533,179 B2 | 5/2009 | Tarquini et al. | |
| 7,536,346 B2 | 5/2009 | Aliffi et al. | |
| 7,546,266 B2 | 6/2009 | Beirne et al. | |
| 7,552,089 B2 | 6/2009 | Bruer et al. | |
| 7,562,093 B2 | 7/2009 | Gelb et al. | |
| 7,571,139 B1 | 8/2009 | Giordano et al. | |
| 7,580,856 B1 | 8/2009 | Pliha | |

(56) References Cited

U.S. PATENT DOCUMENTS

| | | |
|---|---|---|
| 7,590,589 B2 | 9/2009 | Hoffberg |
| 7,596,512 B1 | 9/2009 | Raines et al. |
| 7,596,716 B2 | 9/2009 | Frost et al. |
| 7,610,257 B1 | 10/2009 | Abrahams |
| 7,653,592 B1 | 1/2010 | Flaxman et al. |
| 7,668,840 B2 | 2/2010 | Bayliss et al. |
| 7,672,833 B2 | 3/2010 | Blume et al. |
| 7,672,924 B1 | 3/2010 | Scheurich et al. |
| 7,672,926 B2 | 3/2010 | Ghazal et al. |
| 7,676,751 B2 | 3/2010 | Allen et al. |
| 7,689,505 B2 | 3/2010 | Kasower |
| 7,698,163 B2 | 4/2010 | Reed et al. |
| 7,707,059 B2 | 4/2010 | Reed et al. |
| 7,747,480 B1 | 6/2010 | Agresta et al. |
| 7,747,559 B2 | 6/2010 | Leitner et al. |
| 7,752,236 B2 | 7/2010 | Williams et al. |
| 7,756,789 B2 | 7/2010 | Welker et al. |
| 7,797,252 B2 | 9/2010 | Rosskamm et al. |
| 7,801,812 B2 | 9/2010 | Conlin et al. |
| 7,814,005 B2 | 10/2010 | Imrey et al. |
| 7,818,228 B1 | 10/2010 | Coulter |
| 7,836,111 B1 | 11/2010 | Shan |
| 7,930,242 B2 | 4/2011 | Morris et al. |
| 7,958,126 B2 * | 6/2011 | Schachter ......... G06F 17/30867 707/748 |
| 7,983,932 B2 | 7/2011 | Kane |
| 7,991,901 B2 | 8/2011 | Tarquini et al. |
| 7,996,912 B2 | 8/2011 | Spalink et al. |
| 8,005,759 B2 | 8/2011 | Hirtenstein et al. |
| 8,036,979 B1 | 10/2011 | Torrez et al. |
| 8,099,341 B2 | 1/2012 | Varghese |
| 8,127,986 B1 | 3/2012 | Taylor et al. |
| 8,160,960 B1 * | 4/2012 | Fei ................... G06Q 20/10 705/39 |
| 8,280,805 B1 | 10/2012 | Abrahams et al. |
| 8,285,656 B1 * | 10/2012 | Chang ................ H04L 12/5875 706/15 |
| 8,312,033 B1 | 11/2012 | McMillan |
| 8,315,943 B2 | 11/2012 | Torrez et al. |
| 8,321,952 B2 | 11/2012 | Spalink et al. |
| 8,364,518 B1 | 1/2013 | Blake et al. |
| 8,392,334 B2 | 3/2013 | Hirtenstein et al. |
| 8,463,919 B2 | 6/2013 | Tarquini et al. |
| 8,478,674 B1 | 7/2013 | Kapczynski et al. |
| 8,515,828 B1 | 8/2013 | Wolf et al. |
| 8,595,101 B1 | 11/2013 | Daukas et al. |
| 8,606,666 B1 | 12/2013 | Courbage et al. |
| 8,626,646 B2 | 1/2014 | Torrez et al. |
| 8,639,616 B1 | 1/2014 | Rolenaitis et al. |
| 8,639,920 B2 | 1/2014 | Stack et al. |
| 2001/0011245 A1 | 8/2001 | Duhon |
| 2001/0037332 A1 | 11/2001 | Miller et al. |
| 2001/0039523 A1 | 11/2001 | Iwamoto |
| 2002/0023051 A1 | 2/2002 | Kunzle et al. |
| 2002/0026507 A1 | 2/2002 | Sears et al. |
| 2002/0049701 A1 | 4/2002 | Nabe et al. |
| 2002/0049738 A1 | 4/2002 | Epstein |
| 2002/0069122 A1 | 6/2002 | Yun et al. |
| 2002/0077964 A1 * | 6/2002 | Brody ................... G06Q 30/02 705/38 |
| 2002/0099628 A1 | 7/2002 | Yakaoka et al. |
| 2002/0099824 A1 | 7/2002 | Bender et al. |
| 2002/0101979 A1 | 8/2002 | Borodow et al. |
| 2002/0103809 A1 | 8/2002 | Starzl et al. |
| 2002/0111816 A1 | 8/2002 | Lortscher et al. |
| 2002/0128960 A1 | 9/2002 | Lambiotte et al. |
| 2002/0128962 A1 | 9/2002 | Kasower |
| 2002/0133504 A1 | 9/2002 | Vlahos et al. |
| 2002/0138297 A1 | 9/2002 | Lee |
| 2002/0156676 A1 | 10/2002 | Ahrens et al. |
| 2002/0161664 A1 | 10/2002 | Shaya et al. |
| 2002/0165757 A1 | 11/2002 | Lisser |
| 2002/0169747 A1 | 11/2002 | Chapman et al. |
| 2002/0173984 A1 | 11/2002 | Robertson et al. |
| 2002/0184255 A1 | 12/2002 | Edd et al. |
| 2002/0188544 A1 | 12/2002 | Wizon et al. |
| 2002/0198824 A1 | 12/2002 | Cook |
| 2003/0009418 A1 | 1/2003 | Green et al. |
| 2003/0018549 A1 | 1/2003 | Fei et al. |
| 2003/0018578 A1 | 1/2003 | Schultz |
| 2003/0033242 A1 | 2/2003 | Lynch et al. |
| 2003/0036996 A1 | 2/2003 | Lazerson |
| 2003/0046223 A1 | 3/2003 | Crawford et al. |
| 2003/0050882 A1 | 3/2003 | Degen et al. |
| 2003/0069839 A1 | 4/2003 | Whittington et al. |
| 2003/0083893 A1 | 5/2003 | Aliffi et al. |
| 2003/0097342 A1 | 5/2003 | Whittingtom |
| 2003/0097380 A1 | 5/2003 | Mulhern et al. |
| 2003/0101344 A1 | 5/2003 | Wheeler et al. |
| 2003/0105728 A1 | 6/2003 | Yano et al. |
| 2003/0171942 A1 | 9/2003 | Gaito |
| 2003/0191731 A1 | 10/2003 | Stewart et al. |
| 2003/0212654 A1 | 11/2003 | Harper et al. |
| 2003/0216965 A1 | 11/2003 | Libman |
| 2003/0229892 A1 | 12/2003 | Sardera |
| 2003/0233323 A1 | 12/2003 | Bilski et al. |
| 2004/0010458 A1 | 1/2004 | Friedman |
| 2004/0030649 A1 | 2/2004 | Nelson et al. |
| 2004/0098625 A1 | 5/2004 | Lagadec et al. |
| 2004/0103147 A1 | 5/2004 | Flesher et al. |
| 2004/0107125 A1 | 6/2004 | Guheen et al. |
| 2004/0107132 A1 | 6/2004 | Honarvar et al. |
| 2004/0111359 A1 | 6/2004 | Hudock |
| 2004/0117358 A1 | 6/2004 | Von Kaenel et al. |
| 2004/0128150 A1 | 7/2004 | Lundegren |
| 2004/0128230 A1 | 7/2004 | Oppenheimer et al. |
| 2004/0153330 A1 | 8/2004 | Miller et al. |
| 2004/0153448 A1 * | 8/2004 | Cheng ............... G06F 17/30451 |
| 2004/0163101 A1 | 8/2004 | Swix |
| 2004/0199456 A1 | 10/2004 | Flint et al. |
| 2004/0199789 A1 | 10/2004 | Shaw et al. |
| 2004/0220896 A1 | 11/2004 | Finlay et al. |
| 2004/0225594 A1 | 11/2004 | Nolan, III et al. |
| 2004/0225596 A1 | 11/2004 | Kemper et al. |
| 2004/0230534 A1 | 11/2004 | McGough |
| 2004/0243588 A1 | 12/2004 | Tanner et al. |
| 2004/0243641 A1 | 12/2004 | Allen et al. |
| 2005/0010513 A1 | 1/2005 | Duckworth et al. |
| 2005/0010555 A1 | 1/2005 | Gallivan |
| 2005/0049991 A1 | 3/2005 | Aggarwal |
| 2005/0086579 A1 | 4/2005 | Leitner et al. |
| 2005/0192008 A1 | 9/2005 | Desai et al. |
| 2005/0251820 A1 | 11/2005 | Stefanik et al. |
| 2005/0262158 A1 | 11/2005 | Sauermann |
| 2005/0288998 A1 | 12/2005 | Verma et al. |
| 2005/0289003 A1 * | 12/2005 | Thompson ......... G06Q 30/0227 705/14.28 |
| 2006/0004731 A1 | 1/2006 | Seibel et al. |
| 2006/0020611 A1 | 1/2006 | Gilbert et al. |
| 2006/0036543 A1 | 2/2006 | Blagg et al. |
| 2006/0041443 A1 | 2/2006 | Horvath |
| 2006/0074991 A1 | 4/2006 | Lussier et al. |
| 2006/0080233 A1 | 4/2006 | Mendelovich et al. |
| 2006/0080251 A1 | 4/2006 | Fried et al. |
| 2006/0085454 A1 | 4/2006 | Blegen et al. |
| 2006/0136330 A1 | 6/2006 | DeRoy et al. |
| 2006/0149674 A1 | 7/2006 | Cook et al. |
| 2006/0155639 A1 | 7/2006 | Lynch et al. |
| 2006/0242039 A1 | 10/2006 | Haggerty et al. |
| 2006/0242046 A1 | 10/2006 | Haggerty et al. |
| 2006/0242047 A1 | 10/2006 | Haggerty et al. |
| 2006/0242049 A1 | 10/2006 | Haggerty et al. |
| 2006/0242050 A1 | 10/2006 | Haggerty et al. |
| 2006/0242051 A1 | 10/2006 | Haggerty et al. |
| 2006/0267999 A1 * | 11/2006 | Cash .................... G06Q 40/025 345/581 |
| 2006/0271472 A1 * | 11/2006 | Cagan ................ G06Q 40/025 705/38 |
| 2006/0277092 A1 | 12/2006 | Williams |
| 2006/0282359 A1 | 12/2006 | Nobili et al. |
| 2006/0293932 A1 * | 12/2006 | Cash ................ G06F 17/30539 705/30 |
| 2006/0293979 A1 * | 12/2006 | Cash ................ G06Q 20/4016 705/34 |

(56) References Cited

U.S. PATENT DOCUMENTS

| | | | |
|---|---|---|---|
| 2006/0294199 A1* | 12/2006 | Bertholf | G06F 17/30893 709/217 |
| 2007/0027778 A1 | 2/2007 | Schellhammer et al. | |
| 2007/0030282 A1* | 2/2007 | Cash | G06Q 30/00 345/581 |
| 2007/0067285 A1* | 3/2007 | Blume | G06Q 10/10 |
| 2007/0067437 A1 | 3/2007 | Sindambiwe | |
| 2007/0118393 A1 | 5/2007 | Rosen et al. | |
| 2007/0156554 A1 | 7/2007 | Nikoley et al. | |
| 2007/0185797 A1 | 8/2007 | Robinson | |
| 2007/0192165 A1 | 8/2007 | Haggerty et al. | |
| 2007/0220611 A1 | 9/2007 | Socolow et al. | |
| 2007/0226093 A1* | 9/2007 | Chan | G06Q 40/02 705/35 |
| 2007/0226130 A1 | 9/2007 | Haggerty et al. | |
| 2007/0244732 A1 | 10/2007 | Chatterji et al. | |
| 2007/0282730 A1 | 12/2007 | Carpenter et al. | |
| 2007/0282736 A1 | 12/2007 | Conlin et al. | |
| 2007/0288271 A1 | 12/2007 | Klinkhammer | |
| 2007/0299759 A1 | 12/2007 | Kelly | |
| 2008/0059224 A1 | 3/2008 | Schechter | |
| 2008/0059317 A1* | 3/2008 | Chandran | G06Q 20/20 705/16 |
| 2008/0059449 A1 | 3/2008 | Webster et al. | |
| 2008/0109444 A1 | 5/2008 | Williams et al. | |
| 2008/0120155 A1 | 5/2008 | Pliha | |
| 2008/0120569 A1 | 5/2008 | Mann et al. | |
| 2008/0183504 A1 | 7/2008 | Highley | |
| 2008/0228635 A1 | 9/2008 | Megdal et al. | |
| 2008/0255897 A1 | 10/2008 | Megdal et al. | |
| 2008/0294540 A1* | 11/2008 | Celka | G06Q 40/00 705/35 |
| 2008/0301016 A1 | 12/2008 | Durvasula et al. | |
| 2008/0320575 A1 | 12/2008 | Gelb et al. | |
| 2009/0018996 A1 | 1/2009 | Hunt et al. | |
| 2009/0024428 A1 | 1/2009 | Hudock, Jr. | |
| 2009/0060343 A1 | 3/2009 | Rosca | |
| 2009/0112650 A1 | 4/2009 | Iwane | |
| 2009/0228918 A1 | 9/2009 | Rolff et al. | |
| 2009/0234665 A1 | 9/2009 | Conkel | |
| 2009/0240609 A1 | 9/2009 | Cho et al. | |
| 2009/0254971 A1 | 10/2009 | Herz et al. | |
| 2009/0327120 A1 | 12/2009 | Eze et al. | |
| 2010/0094758 A1* | 4/2010 | Chamberlain | G06Q 10/06375 705/50 |
| 2010/0145840 A1 | 6/2010 | Kasower | |
| 2010/0169159 A1 | 7/2010 | Rose et al. | |
| 2010/0250411 A1 | 9/2010 | Ogrodski | |
| 2010/0250497 A1 | 9/2010 | Redlich et al. | |
| 2011/0016042 A1 | 1/2011 | Cho et al. | |
| 2011/0060905 A1 | 3/2011 | Stack et al. | |
| 2011/0137760 A1 | 6/2011 | Rudie et al. | |
| 2011/0164746 A1 | 7/2011 | Nice et al. | |
| 2011/0184838 A1 | 7/2011 | Winters et al. | |
| 2011/0219421 A1 | 9/2011 | Ullman et al. | |
| 2012/0054592 A1 | 3/2012 | Jaffe et al. | |
| 2012/0072464 A1 | 3/2012 | Cohen | |
| 2012/0124498 A1 | 5/2012 | Santoro et al. | |
| 2012/0173339 A1 | 7/2012 | Flynt et al. | |
| 2012/0265607 A1 | 10/2012 | Belwadi | |
| 2013/0124392 A1 | 5/2013 | Achanta et al. | |
| 2013/0132151 A1 | 5/2013 | Stibel et al. | |
| 2013/0173481 A1 | 7/2013 | Hirtenstein et al. | |
| 2014/0032265 A1 | 1/2014 | Paprocki et al. | |

FOREIGN PATENT DOCUMENTS

| | | |
|---|---|---|
| EP | 0 559 358 | 9/1993 |
| EP | 0 977 128 | 2/2000 |
| EP | 1 122 664 | 8/2001 |
| EP | 0 772 836 | 12/2001 |
| JP | 10-222559 | 8/1998 |
| JP | 10-261009 | 9/1998 |
| JP | 2000-331068 | 11/2000 |
| JP | 2001-297141 | 10/2001 |
| JP | 2001-344463 | 12/2001 |
| JP | 2001-357256 | 12/2001 |
| JP | 2002-149778 | 5/2002 |
| JP | 2002-163498 | 6/2002 |
| JP | 2002-259753 | 9/2002 |
| JP | 2003-271851 | 9/2003 |
| JP | 2003-316881 | 11/2003 |
| KR | 10-2000-0036594 | 7/2000 |
| KR | 10-2000-0063995 | 11/2000 |
| KR | 10-2001-0016349 | 3/2001 |
| KR | 10-2001-0035145 | 5/2001 |
| KR | 10-2002-0007132 | 1/2002 |
| KR | 10-2004-0078798 | 9/2004 |
| WO | WO 95/34155 | 12/1995 |
| WO | WO 96/00945 | 1/1996 |
| WO | WO 98/41931 | 9/1998 |
| WO | WO 98/41932 | 9/1998 |
| WO | WO 98/41933 | 9/1998 |
| WO | WO 99/04350 | 1/1999 |
| WO | WO 99/17225 | 4/1999 |
| WO | WO 99/17226 | 4/1999 |
| WO | WO 99/38094 | 7/1999 |
| WO | WO 99/46710 | 9/1999 |
| WO | WO 00/04465 | 1/2000 |
| WO | WO 00/28441 | 5/2000 |
| WO | WO 01/75754 | 10/2001 |
| WO | WO 01/84281 | 11/2001 |
| WO | WO 03/101123 | 12/2003 |
| WO | WO 2004/114160 | 12/2004 |
| WO | WO 2007/149941 | 12/2007 |
| WO | WO 2008/022289 | 2/2008 |
| WO | WO 2008/054403 | 5/2008 |
| WO | WO 2009/117518 | 9/2009 |
| WO | WO 2010/132492 | 11/2010 |
| WO | WO 2013/009920 | 1/2013 |
| WO | WO 2014/018900 | 1/2014 |

OTHER PUBLICATIONS

U.S. Appl. No. 12/705,511, Feb. 12, 2010, Bargoli et al.
Bitran et al., "Mailing Decisions in Catalog Sales Industry", Management Science (JSTOR), vol. 42, No. 9, pp. 1364-1381, Sep. 1996.
CreditAnalyst, Digital Matrix Systems, as printed out Mar. 4, 2008, pp. 2.
CreditToolkit, Digital Matrix Systems, as printed out Mar. 4, 2008, pp. 2.
Cohen et al., "Optimizer: IBM's Multi Echelon Inventory System for Managing Service Logistics", Interfaces, vol. 20, pp. 65-82, Jan.-Feb. 1990.
"Debt Settlement: Watch Video on how to Pay Your Debt Faster", http://www.debtconsolidationcare.com/debt-settlement.html printed Jan. 9, 2013 in 6 pages.
eFunds Introduces QualiFileSM, Deluxe Corporation, eFunds Press Release and Product Launch, Sep. 23, 1999, Milwaukee, WI.
Elmasri et al., "Fundamentals of Database Systems, Third Edition (Excerpts)", Jun. 2000, pp. 253, 261, 268-270, 278-280, 585, 595.
Ettorre, Paul Kahn on Exceptional Marketing, Management Review, vol. 38(11), Nov. 1994, pp. 48-51.
Experian, Custom Strategist and Qualifile from Funds, 2000, in 2 pages.
Fisher, Joseph, "Access to Fair Credit Reports: Current Practices and Proposed Legislation," American Business Law Journal, Fall 1981, vol. 19, No. 3, p. 319.
Haffar, Imad, "'SPAM': A Computer Model for Management of Spare-Parts Inventories in Agricultural Machinery Dealerships", Computers and Electronics in Agriculture, vol. 12, Issue 4, Jun. 1995, pp. 323-332.
Handfield, Robert B. et al., "Managing Component Life Cycles in Dynamic Technological Environments", International Journal of Purchasing and Materials Management, Tempe, vol. 30, Iss. 2, p. 20, 9 pgs., Spring 1994, ProQuest ID 590096.
Ideon, Credit-Card Registry that Bellyflopped this Year, Is Drawing some Bottom-Fishers, The Wall Street Journal, Aug. 21, 1995, pp. C2.

(56) References Cited

OTHER PUBLICATIONS

Inderfurth et al., "Decision Support for Spare Parts Acquisition in Post Product Life Cycle", Central European Journal of Operations Research, vol. 16, pp. 17-42, 2008 [Initially published online Dec. 21, 2007].
"Japan's JAAI system appraises used cars over internet", Asia Pulse, Mar. 3, 2000.
Käki, Anssi, "Forecasting in End-of-Life Spare Parts Procurement", Master's Thesis—Helsinki University of Technology System Analysis Laboratory, Jul. 27, 2007.
Kim, Bowon et al., Optimal Pricing, EOL (End of Life) Warranty, and Spare Parts Manufacturing Strategy Amid Product Transition, European Journal of Operation Research, vol. 188, pp. 723-745, 2008 [Initially published online May 1, 2007].
Klein, et al., "A Constant-Utility Index of the Cost of Living", The Review of Economic Studies, pp. 84-87, vol. XV-XVI, Kraus Reprint Corporation, New York, 1960.
Klein, et al., "An Econometric Model of the United States: 1929-1952", North-Holland Publishing Company, Amsterdam, 1955, pp. 4-41.
Klein, Lawrence R., "The Keynesian Revolution", New York, The MacMillan Company, 1947, pp. 56-189.
Krupp, James A.G.; "Forecasting for the Automotive Aftermarket"; The Journal of Business Forecasting Methods & Systems; Winter 1993-1994; 12, 4; ABI/Inform Global; pp. 8-12.
Lanubile, et al., "Evaluating Empirical Models for the Detection of High-Risk Components: Some Lessons Learned", 20th Annual Software Engineering Workshop, Nov. 29-30, 1995, Greenbelt, Maryland, pp. 1-6.
Lapide, Larry, "New Developments in Business Forecasting", The Journal of Business Forecasting, pp. 12-14, Spring 2002.
Loshin, Intelligent Enterprise: Better Insight for Business Decisions, "Value-Added Data: Merge Ahead", Feb. 9, 2000, vol. 3, No. 3, 5 pages.
Miller, Joe, "NADA used-car prices go online", Automotive News, Jun. 14, 1999, p. 36.
Moore, John R., Jr. "Forecasting and Scheduling for Past-Model Replacement Parts" Management Science, Application Series, vol. 18, No. 4, Part 1, Dec. 1971, pp. B200-B213.
Packer, A. H., "Simulation and Adaptive Forecasting an Applied to Inventory Control", Operations Research, vol. 15, No. 4, pp. 660-679, Jul. 1965.
"Parse", Definition from PC Magazine Encyclopedia, http://www/pcmag.com/encyclopedia_term_0,2542,t=parse&i=48862,00.asp as downloaded Mar. 5, 2012.
Peters, Peter-Paul, "A Spare Parts Configurator for the European Service Business" (Graduation Report); Honeywell, Industrial Service Logistic Center; Amsterdam, The Netherlands; 80 Pgs.; Mar. 2000.
Ponniah, Paulraj, "Data Warehousing Fundamentals: A Comprehensive Guide for IT Professionals", Wiley-Interscience Publication, pp. 257-289, 377-397, Aug. 3, 2001.
Porter, G. Zell, "An Economic Method for Evaluating Electronic Component Obsolescence Solutions", Retrieved from the web at www.gidep.org/data/dmsms/library/zell.pdf, May 1998, pp. 1-9.
"PremierGuide Announces Release 3.0 of Local Search Platform", Business Wire, Mar. 4, 2004, Palo Alto, CA, p. 5574.
"Qualifying for Debt Settlement", http://www.certifieddebt.com/debt/settlement-qualifications.shtml printed Jan. 9, 2013 in 2 pages.
Rahm, et al. "Data Cleaning: Problems and Current Approaches", Bulletin of the IEEE Computer Society Technical Committee on Data Engineering, Dec. 2000, vol. 23, No. 4, pp. 11.
Raman, et al., "Potter's Wheel: An Interactive Data Cleaning System", Proceedings of the 27th VLDB Conference, Roma, Italy, 2001, pp. 10.
"Resolve Debt for Less: With Help from Freedom Financial" http://www.debtsettlementusa.com/ printed Jan. 9, 2013 in 6 pages.
Roos, Gina, "Web-Based Service Helps OEMs Cure Parts Obsolescence Blues", Electronic Engineering Times, p. 86, Oct. 8, 2001, Dialog 09056737 78968668.
Santarini, Michael, "Forecasts the Probably Obsolescence of Components—Module Predicts Parts Life", Electronic Engineering Times, Jan. 11, 1999, p. 48(1), Dialog 0607160353548246.
Sawyers, Arlena, "NADA to Offer Residual Guide", Automotive News, May 22, 2000, p. 3.
Sax, Michael M., Data Collection and Privacy Protection: An International Perspective, Presentation: Managing Online Risk and Liability Conference, Aug. 31, 1999, pp. 58.
"Settling Your Debts—Part 1 in Our Debt Settlement Series", http://www.creditinfocenter.com/debt/settle_debts.shtml printed Jan. 9, 2013 in 6 pages.
Smith, Wendell R., "Product Differentiation and Market Segmentation as Alternative Marketing Strategies", The Journal of Marketing, The American Marketing Association, Brattleboro, Vermont, Jul. 1956, vol. XXI, pp. 3-8.
Stone, "Linear Expenditure Systems and Demand Analysis: An Application to the Pattern of British Demand", The Economic Journal: The Journal of the Royal Economic Society, Sep. 1954, pp. 511-527, vol. LXIV, Macmillan & Co., London.
Sullivan, Laurie, "Obsolete-Parts Program Thriving", EBN, Manhasset, Issue 1296, p. 26, Jan. 2002, ProQuest 10 101195090.
Tao, Lixin, "Shifting Paradigms with the Application Service Provider Model"; Concordia University, IEEE, Oct. 2001, Canada.
Various Posts from the http://www.2p.wrox.com Forums: http://web.archive.org/web/2005045221950/http://p2p.wrox.com/topic.asp?TOPIC_ID=6513, dated Nov. 15, 2003-Oct. 7, 2004.
"WashingtonPost.com and Cars.com launch comprehensive automotive web site for the Washington area", PR Newswire, Oct. 22, 1998.
Web Page posted at: http://web.archive.org/web20040805124909/http://www.oracle.com/technology/sample_codete/tech/pl_sq/htdocs/x/Case/start.htm, pp. 1 and 4 of the webpages posted on Jan. 7, 2003.
Webpage printed from http://www.magnum.net/pdfs/RapUpBrochure.pdf as printed Mar. 3, 2008.
Webpage printed out from http://www.fairisaac.com/NR/rdonlyres/AC4C2F79-4160-4E44-B0CB-5C899004879A/0/ScoreNetnetworkBR.pdf on Mar. 4, 2008.
Webster, Lee R., "Failure Rates & Life Cycle Costs", Consulting-Specifying Engineer; 23, 4; ABI/INFORM Global, Apr. 1998, p. 42.
Working, Holbrook, "Statistical Laws of Family Expenditure", Journal of the American Statistical Association, pp. 43-56, vol. 38, American Statistical Association, Washington, D.C., Mar. 1943.
Zoot—Decision Engine, www.zootweb.com/decision_engine.html as printed on Mar. 3, 2008.
Zoot—Instant Rules GUI, www.zootweb.com/instant_rules_GUI.html as printed Mar. 3, 2008.
Zoot—Pre-Built Standard Attributes, www.zootweb.com/credit_attributes.html as printed Mar. 3, 2008.
Zoot—Rules Management GUI, www.zootweb.com/business_rules_GUI.html as printed Mar. 3, 2008.
Zoot—Zoot's Hosted Environment, http://www.zootweb.com/zootasp.html as printed. Mar. 3, 2008.
International Search Report and Written Opinion for Application No. PCT/US2012/046316, dated Sep. 28, 2012.
International Search Report and Written Opinion for Application No. PCT/US09/60393, dated Dec. 23, 2009.
International Search Report and Written Opinion for Application No. PCT/US09/37565, dated May 12, 2009.
International Search Report and Written Opinion for Application No. PCT/US2010/034434, dated Jun. 23, 2010.
Buxfer, http://www.buxfer.com/ printed Feb. 5, 2014 in 1 page.
Check, http://check.me/ printed Feb. 5, 2014 in 3 pages.
Manilla, http://www.manilla.com/how-it-works/ printed Feb. 5, 2014 in 1 page.
Mint.com, http://www.mint.com/how-it-works/ printed Feb. 5, 2013 in 2 pages.
Mvelopes, http://www.mvelopes.com/ printed Feb. 5, 2014 in 2 pages.
PersonalCapital.com, http://www.personalcapital.com/how-it-works printed Feb. 5, 2014 in 5 pages.
Yodlee | Money Center, https://yodleemoneycenter.com/ printed Feb. 5, 2014 in 2 pages.

(56) References Cited

OTHER PUBLICATIONS

You Need A Budget, http://www.youneedabudget.com/features printed Feb. 5, 2014 in 3 pages.
International Preliminary Report on Patentability and Written Opinion for Application No. PCT/US2012/046316 dated Jan. 14, 2014.
International Preliminary Report on Patentability for Application No. PCT/US2010/034434, dated Feb. 4, 2014.

* cited by examiner

170

| BRANDING | | My ATB | Tools | Help | Administer Users | Log Out | | |
|---|---|---|---|---|---|---|---|---|
| HOME | SYSTEMS ▽ | ATTRIBUTES▽ | | FILTERS▽ | | TEST▽ | | |

ATTRIBUTES   Client Name...edit        (new attributes) (▣▫tutorial mode)    — 304

SEARCH — 302

Name Keyword(s):
[          ]
System
[Select...  ▽]
Format
[Select...  ▽]
Last Edited by:
[Select...  ▽]
Created: [Select... ▽]
Last Edited: [Select... ▽]
Status: [Select... ▽]
Locked: [Select... ▽]
☒STAGG: [Select... ▽]

( Select... )

Recently Viewed Attributes:
Short Name up to 30 Characters
Short Name up to 30 Characters
Short Name up to 30 Characters
Short Name up to 30 Characters
Short Name up to 30 Characters
Short Name up to 30 Characters 120 to 120 ATTRIBUTES                                   ◁|1|2|3|4|5|6|▷

| SHORT NAME | SYSTEM | STATUS | LOCK |
|---|---|---|---|
| Short Name... | System Name | ☐ Status | ☐ Status |
| Short Name... | System Name, System Name | ☐ Status | ☐ Status |
| Short Name... | System Name | ☐ Status | ☐ Status |
| Short Name... | System Name | ☐ Status | ☐ Status |
| Short Name... | System Name, System Name | ☐ Status | ☐ Status |
| Short Name... | System Name | ☐ Status | ☐ Status |
| Short Name... | System Name, System Name | ☐ Status | ☐ Status |
| Short Name... | System Name, System Name | ☐ Status | ☐ Status |
| Short Name... | System Name | ☐ Status | ☐ Status |
| Short Name... | System Name, System Name | ☐ Status | ☐ Status |
| Short Name... | System Name | ☐ Status | ☐ Status |
| Short Name... | System Name | ☐ Status | ☐ Status |
| Short Name... | System Name, System Name | ☐ Status | ☐ Status |
| Short Name... | System Name | ☐ Status | ☐ Status |
| Short Name... | System Name, System Name | ☐ Status | ☐ Status |
| Short Name... | System Name, System Name | ☐ Status | ☐ Status |

Show per page: [20▽]   List View :   Set Preference| Restore Default    ◁|1|2|3|4|5|6|▷

FIG. 5A

| Raw Data (Experian) | |
|---|---|
| Filters (Experian) | |
| Functions & Operators | |
| Add New Function | EXP |
| IF...THEN | AND |
| IF...THEN...ELSE... | OR |
| FOR...NEXT | + |
| RIGHT() | − |
| LEFT() | * |
| MIDDLE() | / |
| EMPTY | < |
| INITIALIZATION() | <= |
| DEFAULT() | > |
| MIN() | >= |
| MAX() | = |
| ABS() | <> |
| NUM() | 1/x |
| STRING() | % |
| COUNT() | Etc. |
| ROUND() | |
| ROUNDUP() | |
| ETC. | |

FIG. 5C

| BRANDING | | My ATB | Tools | Help | Administer Users | Log Out |
|---|---|---|---|---|---|---|
| HOME | SYSTEMS ▽ | ATTRIBUTES ▽ | | FILTERS ▽ | | TEST ▽ |

FILTERS    Client Name...(edit client)   ( new filter )  ( ○ reset )  ( ○ tutorial mode )

FILTER: SHORTNAME                     ( close ) ( delete ) ( print ) ( edit ) ( save as )
| Overview | Code | Validate | History | Where Used |

SAELESCT COMPONENT TYPE: [ Experian |<]
                                            340

| SHORTNAME | STATUS | LOCK | EX | EQ | TU |
|---|---|---|---|---|---|
| Short Name... | ☐ Status | ☐ Status | ✓ | ✓ | ✓ |
| Short Name... | ☐ Status | ☐ Status | ✓ | ✓ | |
| Short Name... | ☐ Status | ☐ Status | | ✓ | ✓ |
| Short Name... | ☐ Status | ☐ Status | ✓ | | |
| Short Name... | ☐ Status | ☐ Status | ✓ | ✓ | ✓ |
| Short Name... | ☐ Status | ☐ Status | ✓ | ✓ | |
| Short Name... | ☐ Status | ☐ Status | | ✓ | ✓ |
| Short Name... | ☐ Status | ☐ Status | ✓ | | |
| Short Name... | ☐ Status | ☐ Status | ✓ | ✓ | ✓ |
| Short Name... | ☐ Status | ☐ Status | ✓ | ✓ | |
| Short Name... | ☐ Status | ☐ Status | | ✓ | ✓ |
| Short Name... | ☐ Status | ☐ Status | ✓ | | |

FIG. 6C

| | ATTRIBUTE: ALL002 | DATA FILE: | C:\otbu\TestCases\EX\1234567 | Browse... | Data Source: | Experian ▽ | |
|---|---|---|---|---|---|---|---|
| DATA OPTIONS: ▷ PRINT | | ↻ RESET | | | | ▷ Run | |

ALL002: 52.0

| Id | tr_kob | TR_INACTIVE | TR_STATUS_OPC | TR_PAID | TR_CLOSED | tr_trade | tr_open | tr_type | tr_status | tr_spc_cr |
|---|---|---|---|---|---|---|---|---|---|---|
| 1 | BC | N | Y | N | N | Y | N | 18 | 97 | |
| 2 | FU | N | Y | N | N | Y | N | 31 | 93 | |
| 3 | YC | N | Y | N | N | N | N | 48 | 93 | |
| 4 | BS | N | Y | N | N | Y | N | 19 | 87 | |
| 5 | DC | Y | Y | N | N | Y | N | 07 | 05 | 31 |
| 6 | BB | Y | Y | N | N | Y | N | 07 | 80 | 31 |
| 7 | FM | Y | Y | N | N | Y | N | 27 | 05 | 31 |
| 8 | FF | Y | Y | N | N | Y | N | 12 | 05 | 28 |
| 9 | FF | Y | Y | N | N | Y | N | 12 | 05 | 28 |
| 10 | RE | Y | Y | N | N | Y | N | 19 | 05 | 31 |
| 11 | FM | Y | Y | N | N | Y | N | 19 | 05 | 31 |
| 12 | BB | Y | Y | N | N | Y | N | 12 | 05 | 29 |
| 13 | BB | Y | Y | N | N | Y | N | 12 | 05 | 29 |

FIG. 7

| BRANDING | EXP-157C1 |
| --- | --- |
| | My ATB \| Tools \| Help \| Administer Users \| Log Out |

| HOME | SYSTEMS ▽ | ATTRIBUTES ▽ | FILTERS ▽ | TEST ▽ |

CREATE A NEW CLIENT     (cancel) (save)

*Required fields

One or more errors were detected. Please see below for more information. —362

You must enter a name for this client.

*Client Name [ ] 50

Notes [ ]

*Data Source(s)
What is this?
- ☐ Equifax
- ☐ Experian
- ☐ Transunion
- ☐ Data Source A has long name
- ☐ Data Source B
- ☐ Data Source C
- ☐ Data Source D has long name
- ☐ Data Source E
- ☐ Data Source F
- ☐ Data Source G
- ☐ Data Source H
- ☐ Data Source I
- ☐ Data Source J
- ☐ Data Source K has long name
- ☐ Data Source L

360

System 1 [ ] 50   What is this?

System 2 [ ] 50

System 3 [ ] 50

Add another system (cancel)     (save)

FIG. 8A

| BRANDING | | My ATB \| Tools \| Help \| Administer Users \| Log Out | | |
|---|---|---|---|---|
| HOME | SYSTEMS ▽ | ATTRIBUTES▽ | FILTERS▽ | TEST▽ |

CLIENTS & SYSTEMS  (new client) (↻ reset)

CLIENT: CLIENT NAME  (cancel) (print)

DEPLOY SYSTEMS  (deploy)

| SYSTEM NAME | LAST DEPLOYED | STATUS | # OF ATTRIBUTES |
|---|---|---|---|
| ☐ *System Name...* | 4/22/07 9:41AM by UserName | ☐ *Available to Deploy* | *13 (edit)* |
| ☐ *System Name...* | 1/07/07 9:41AM by UserName | ☐ *Available to Deploy* | *22 (edit)* |
| ☐ *System Name...* | NA | ☐ *Available to Deploy* | *2 (edit)* |
| *System Name...* | NA | ☐ *No Attributes* | *0 (edit)* |
| *System Name...* | 10/25/06 9:41AM by UserName | ☐ *Syntax Errors* | *4 (edit)* |
| ☐ *System Name...* | NA | ☐ *Available to Deploy* | *4 (edit)* |
| ☐ *System Name...* | 5/30/07 9:41AM by UserName | ☐ *Available to Deploy* | *22 (edit)* |
| ☐ *System Name...* | 4/22/07 9:41AM by UserName | ☐ *Available to Deploy* | *2 (edit)* |
| ☐ *System Name...* | 10/25/06 9:41AM by UserName | ☐ *Available to Deploy* | *4 (edit)* |
| ☐ *System Name...* | 4/22/07 9:41AM by UserName | ☐ *Available to Deploy* | *13 (edit)* |

Select All  De-select All (cancel)  (deploy)

| BRANDING | | My ATB | Tools | Help | Administer Users | Log Out |
| --- | --- | --- | --- |
| HOME | SYSTEMS ▽ | ATTRIBUTES▽ | FILTERS▽ | TEST▽ |
| TOOLS | | | | |

| | 200 of 200 DATA SOURCES | <|1|2|3|4|5|6|> |
| --- | --- | --- |
| Overview | | |
| Data Sources | [____]( search ) | |
| Reports | | |
| Import | | |
| Export | | |

| SHORT NAME ▽ | Long Name | LAST MODIFIED |
| --- | --- | --- |
| Short Name... | Long Name Goes Here... | 8/1/07 4:32PM by UserName |
| Short Name... | Long Name Goes Here... | 8/1/07 4:32PM by UserName |
| Short Name... | Long Name Goes Here... | 8/1/07 4:32PM by UserName |
| Short Name... | Long Name Goes Here... | 8/1/07 4:32PM by UserName |
| Short Name... | Long Name Goes Here... | 8/1/07 4:32PM by UserName |
| Short Name... | Long Name Goes Here... | 8/1/07 4:32PM by UserName |
| Short Name... | Long Name Goes Here... | 8/1/07 4:32PM by UserName |
| Short Name... | Long Name Goes Here... | 8/1/07 4:32PM by UserName |

386

<|1|2|3|4|5|6|>

EDIT DATA SOURCE: SHORTNAME   (cancel) (print) (save)

*Required fields

*Short Name:  [DATA_SOURCE_01]   30   What is this?

*Long Name:  [New data source sed pede vel orci auctor consequat]   5   What is this?

Description  [Lorem ipsum dolor sit amet, consectetuer adipiscing elit. Donec convallis, leo in condimentum cursus, nunc justo interdum leo, vitae porttitor odio lorem eget risus. Nullam rutrum, nisi at pellentesque consequat, orci eros auctor justo, eu volupat eros lorem vel sapien.] 124

388

*File Name:  [Users selects name and location of data source file]   (browse)

(cancel)                                                              (save)

FIG. 9A

| BRANDING | | | My ATB \| Tools \| Help \| Administer Users \| Log Out | |
|---|---|---|---|---|
| HOME | SYSTEMS ▽ | ATTRIBUTES▽ | FILTERS▽ | TEST▽ |

TOOLS

| | | | |
|---|---|---|---|
| Overview | EXPORT SYSTEMS | | <\|1\|2\|3\|4\|5\|6\|> |
| Data Sources | Select a Client: [Bank of America]  What is this? | | |
| Reports | | | |
| Import | | | |
| Export | | | |

| SHORT NAME ▽ | Long Name | STATUS | # OF ATTRIBUTES |
|---|---|---|---|
| ☑ System Name | 4/22/07 9:41AM by UserName | Ready to Export | 13 (edit) |
| ☑ System Name | 1/07/07 9:41AM by UserName | Ready to Export | 22 (edit) |
| System Name | N/A | No Attributes | 0 (edit) |
| System Name | N/A | Syntax Errors | 10 (edit) |
| ☑ System Name | 10/25/06 9:41 by UserName | Ready to Export | 4 (edit) |
| ☐ System Name | N/A | Ready to Export | 4 (edit) |
| ☐ System Name | 5/30/07 9:41AM by UserName | Ready to Export | 22 (edit) |
| ☐ System Name | 4/22/07 9:41AM by UserName | Ready to Export | 2 (edit) |
| ☐ System Name | 10/25/06 9:41AM by UserName | Ready to Export | 4 (edit) |
| ☐ System Name | 4/22/07 9:41AM by UserName | Ready to Export | 13 (edit) |
| ☐ System Name | N/A | Ready to Export | 4 (edit) |
| ☐ System Name | 5/30/07 9:41AM by UserName | Ready to Export | 22 (edit) |
| ☐ System Name | 4/22/07 9:41AM by UserName | Ready to Export | 2 (edit) |
| ☐ System Name | 10/25/06 9:41AM by UserName | Ready to Export | 4 (edit) |
| ☐ System Name | 4/22/07 9:41AM by UserName | Ready to Export | 13 (edit) |

Select All  De-select All

390

(cancel)  (next)

FIG. 9B

SYSTEM AND METHOD FOR PROVIDING AN AGGREGATION TOOL

CROSS-REFERENCE TO RELATED APPLICATIONS

This application is a continuation of U.S. patent application Ser. No. 12/022,954 filed on Jan. 30, 2008, soon to issue as U.S. Pat. No. 8,606,666, entitled "SYSTEM AND METHOD FOR PROVIDING AN AGGREGATION TOOL," which claims the benefit of priority under 35 U.S.C. §119(e) of U.S. Provisional Patent Application No. 60/887,523 filed on Jan. 31, 2007, both of the entire contents of which are hereby incorporated by reference in their entirety herein and should be considered a part of this application. All publications and patent applications mentioned in this specification are herein incorporated by reference in their entirety and made a part of this specification to the same extent as if each individual publication or patent application was specifically and individually indicated to be wholly incorporated by reference.

BACKGROUND OF THE INVENTION

Field of the Invention

The disclosure relates generally to the field of scoring and prediction and to tools to improve the flexibility and efficiency in generating and evaluating aggregated attributes.

Description of the Related Art

There exists significant interest in information indicative of the relative financial risk or profitability of potential business transactions with individuals or other entities. For example, a lending institution is interested in the relative likelihood of a loan recipient timely and reliably making mutually agreed loan payments. An insurance company is interested in the relative likelihood of claims arising from an existing or potential client. Such predictive information is a factor in deciding whether to engage in a particular business transaction and/or the terms under which a transaction takes place.

A large variety of public records and privately developed databases can be utilized to inform such risk/benefit determinations. For example, credit reporting agencies (CRAs) collect and maintain information on a person's individual credit history. This information can include a total credit line on one or more accounts, current credit balance, credit ratios, satisfactorily paid accounts, any late payments or delinquencies, depth of credit history, total outstanding credit balance, and/or records of recent and/or historical inquiries into the person's credit. Governmental motor vehicle agencies generally maintain records of any vehicle code violations by a person as well as histories of reported accidents. Courts will generally maintain records of pending or disposed cases associated with a person, such as small claims filings, bankruptcy filings, and/or any criminal charges. Similar information also exists for large and small businesses, such as length of the business's existence, reported income, profits, outstanding accounts receivable, payment history, market share, and so forth.

The extensive amount of data available for any given person or entity makes the task of evaluating a business decision regarding the person or entity very difficult. Accordingly, such raw data is frequently processed to facilitate more convenient and rapid financial decisions. For example, a person's raw financial data can be processed to produce a "score" indicative of their relative credit worthiness. Such a score can be utilized in decisions to extend the person or entity further credit and/or as a factor in determining an interest rate to be charged. The evaluation of the relative risk/benefit of a given decision is even more complex when considering multiple persons simultaneously, such as spouses, partnerships, sole proprietorships, joint ventures, LLCs or other entities. When considering multiple persons, raw data from multiple sources about each of the individuals may need to be evaluated.

Attributes can be used to calculate various types of scores and in many instances may be used on their own to guide business decisions as well. Attributes can be aggregated to target various aspects of credit histories, bankruptcy data, and other types of non-credit-based data. For example, a simple attribute could be "consumers who have opened a new credit line in the last 12 months." The results of the attribute would be a set of consumers who meets both the criteria of having opened a new credit line and having done so in the last 12 months. Therefore, attributes are important in facilitating the use of raw data for a variety of decisions that financial institutions and other entities may need to make.

SUMMARY OF THE DISCLOSURE

Embodiments of the present invention provide systems and methods for creating, managing, and calculating attributes and filters for multiple data sources. One embodiment is an attribute toolbox (ATB) architecture that comprises an ATB user interface (ATB UI) and an ATB engine system.

One embodiment of the present invention is a system for creating and using credit data attributes, comprising an attribute repository for storing a plurality of credit data attributes, a first application server executing a platform-independent user interface application, a credit data repository, and a second application server executing an attribute calculation engine system, wherein the attribute calculation engine system is configured to retrieve credit data from the credit data repository and performs calculations on the credit data in accordance to the attributes in a deployment package generated by the user interface application. In one embodiment, the user interface application further comprises a development interface for editing credit data attributes, wherein the development interface is configured to retrieve the credit data attributes from the attribute repository for editing and return edited credit data attributes or newly created credit data attributes for saving in the attribute repository, a validation interface for testing credit data attributes, wherein the user interface application is configured to execute a validation engine to calculate credit data attributes on test credit data and display the results on the validation interface, and a management interface for managing the deployment of the credit data attributes, wherein the credit data attributes are saved into a deployment package.

Another embodiment is a system for creating of data attributes, comprising an attribute repository and a user interface application configured to receive a plurality of requests from users. The attribute repository stores a plurality of data attribute elements, including attributes, filters, functions, operators, and data definitions. The user interface application further comprises a development interface for editing attribute elements, wherein the development interface is configured to retrieve attribute elements from the attribute repository for editing and return edited attribute elements or newly created attribute elements for saving in the attribute repository, and a validation interface for testing data attributes, wherein the user interface application is configured to execute a validation processing engine to calculate data attributes on test credit data and display the calculation results of the individual attribute elements on the validation interface.

One embodiment is a system for calculating credit data attributes, comprising at least one credit data repository, a first plurality of application servers executing a plurality of attribute calculation engines, a second plurality of application servers executing a plurality of data access engines, wherein the data access engines are configured to access data from the at least one credit data repository, and a third plurality of application servers executing a plurality of façade applications, wherein the façade applications are configured to receive a plurality of attribute calculation requests from a plurality of calling applications, send corresponding requests to the attribute calculation engines and data access engines, and return calculation results from the attribute calculation engines to the calling applications.

One embodiment is a method for building attributes for data from multiple data sources, comprising the steps of defining a plurality of filters, wherein each filter takes into account the format of a data source among a plurality of data sources, defining a plurality of data source-independent attributes, wherein the attributes operate on data selected by the plurality of filters, and creating a deployment package based on the plurality of attributes.

One embodiment is a method for calculating data scores based on data from multiple data sources, comprising the steps of selecting a plurality of data sets from a plurality of data sources, wherein each of the plurality of data sources stores its data in a different format, defining a plurality sets of filters, wherein each set of filters takes into account the format of each of the plurality of data sources, defining a plurality of data source-independent attributes, extracting a subset of data from each of the selected data sets in accordance to the filters, calculating the attributes based on the subset of data, and aggregating the results obtained from the step of calculating to create data scores.

One embodiment of the present invention is a system for creating and using data attributes, comprising an attribute repository for storing a plurality of data attributes, a first application server executing a platform-independent user interface application, a data repository, and a second application server executing an attribute calculation engine system, wherein the attribute calculation engine system is configured to retrieve data from the data repository and performs calculations on the data in accordance to the attributes in a deployment package generated by the user interface application. In one embodiment, the user interface application further comprises a development interface for editing data attributes, wherein the development interface is configured to retrieve the data attributes from the attribute repository for editing and return edited data attributes or newly created data attributes for saving in the attribute repository, a validation interface for testing data attributes, wherein the user interface application is configured to execute a validation engine to calculate data attributes on test data and display the results on the validation interface, and a management interface for managing the deployment of the data attributes, wherein the data attributes are saved into a deployment package.

BRIEF DESCRIPTION OF THE DRAWINGS

Specific embodiments of the invention will now be described with reference to the following drawings, which are intended to illustrate embodiments of the invention, but not limit the invention:

FIG. 5A is an example computer screen showing how attributes are located and managed in the ATB UI according to one embodiment;

FIG. 5C is an example computer screen showing how functions and operators can be added to attributes according to one embodiment;

FIG. 6C is a computer screen showing a search and browse interface displaying how filters are used according to one embodiment;

FIG. 7 is an example computer screen of the validation interface showing the results of the validation engine according to one embodiment;

FIG. 8A is an example computer screen showing how a client system can be created in the ATB UI according to one embodiment;

FIG. 8C is an example computer screen showing how multiple clients and systems are managed in the ATB UI according to one embodiment;

FIG. 9A is an example computer screen showing how multiple data sources are managed in the ATB UI according to one embodiment; and FIG. 9B is an example computer screen showing show attributes and filters can be exported according to one embodiment.

DETAILED DESCRIPTION OF PREFERRED EMBODIMENTS

Figure 1:
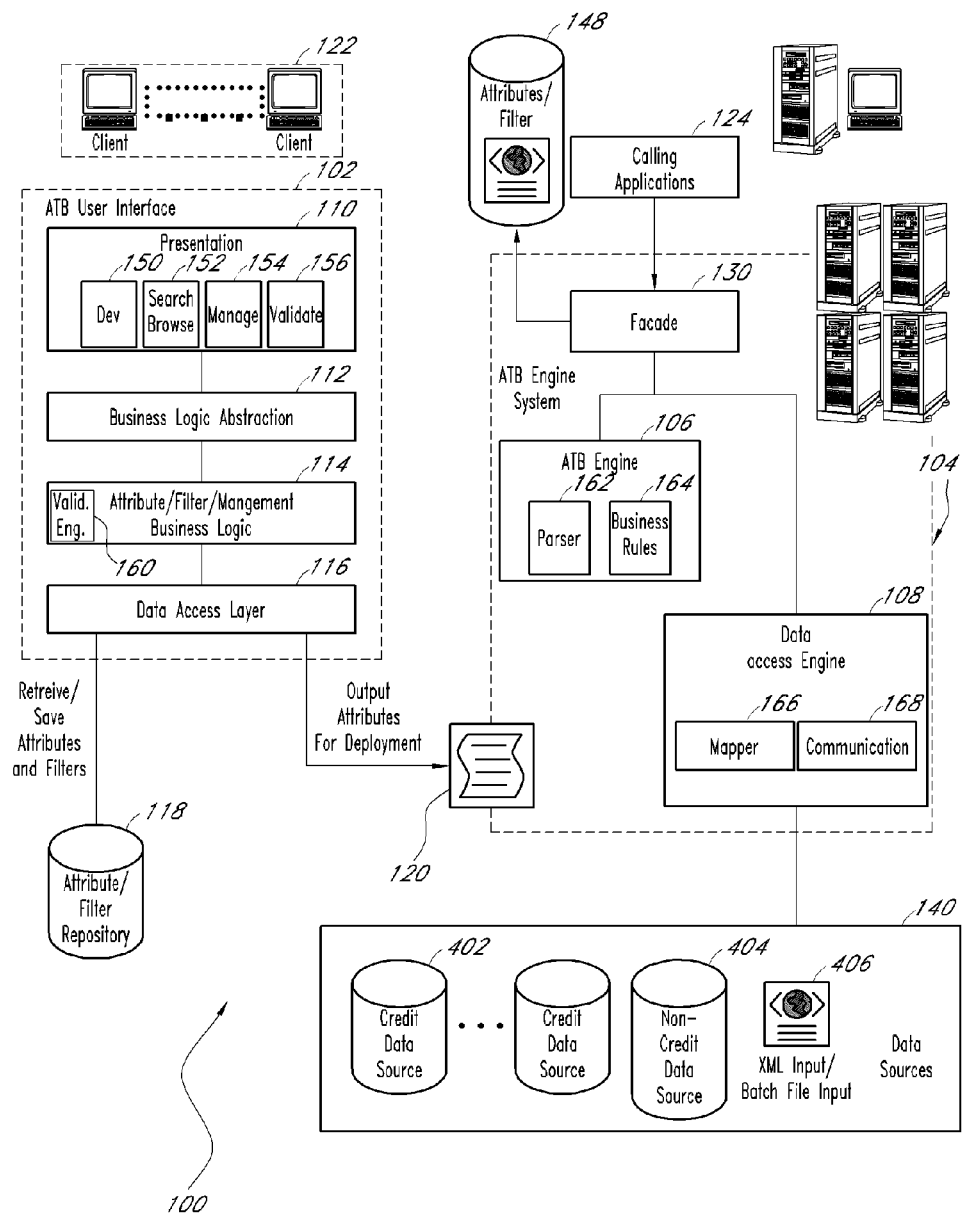
FIG. 1 illustrates the architecture of the ATB architecture according to an embodiment.

Embodiments of the ATB UI system architecture solve many problems associated with developing, managing, and deploying attributes. First, many common aggregated attributes are often complex, referencing other attributes as well as filters that are data format dependent. The filters themselves have to be coded to access specific fields within a data source. For example, since each of the main CRAs in the United States maintains data in a different format, a separate filter is often used for each CRA. Therefore, the development of filters and attributes is often a tedious process and syntax errors frequently occur. Those skilled in the art will recognize that attributes can be developed for non-credit data sources, and the challenge of accounting for the individual formats of non-credit data sources exist as well. In one embodiment, the ATB UI includes a development interface that allows for filters and attributes to be moved via the UI, for example, into a coding area in which an attribute or a filter is being edited. In another embodiment, the ATB UI provides a filter development interface that presents data fields to the user. The interface simplifies the task of developing filters for multiple data sources that have different formats by presenting the data fields of the data sources in a graphical user interface. The fields can be moved into coding area as well, ensuring that proper data field references are included.

Second, the development of efficient and accurate attributes relies on extensive testing on raw data and constant revisions are made based on test results. Attributes often reference other attribute elements in a long chain of dependencies, including other attributes that may in turn reference numerous filters. For example, in developing an attribute that uses five other attributes, a developer may have to run numerous tests in order to arrive at the proper weight that should be accorded to each of the five attributes. In one embodiment, the ATB UI includes a validation interface that advantageously allows the user to see results returned by each attribute element that is referenced by the attribute that is currently being tested. One embodiment displays the results of each filter and each attribute that is referenced by the attribute that is being validated. This enables the user to quickly determining any errors or performance problems hidden in the chain of dependencies. The user can, for example, quickly determine that a filter is selecting a wrong field or that an attribute calculation is returning erroneous or undesirable results. The interface is particularly helpful in the development of aggregation attributes, which often reference a large number attributes and filters. The ability to trace the results of the individual elements is invaluable to the development of such attributes.

Third, institutions often require the use hundreds of attributes in multiple combinations to handle complex analysis and modeling on credit-based and non-credit based data. As a result, both the creation and maintenance of filters and attributes can require significant time and effort. Finally, the ability to effectively calculate attributes and scores on data from multiple data sources also presents significant challenges as well.

Embodiments of the ATB UI and ATB engine system architectures facilitate the management of the attributes and remove some of the difficulties that come with having to manually configure the deployment of attributes in system files. In one embodiment, the ATB UI allows users to associate groups of attributes into a system through a graphical user interface. The ATB UI also provides a comprehensive view of how attributes are deployed in various systems. Users can quickly and easily view the dependencies between attributes and the associated systems and determine how editing an attribute will affect the systems in their deployment scheme. In one embodiment, upon user request the ATB UI will automatically output a single deployment package including all of the user's systems, along with the proper associations of attributes, filters, and other configuration information. The deployment package can then be used in the ATB engine system, a system that performs attribute calculations.

In one embodiment, the ATB engine system is configured to dynamically access multiple data sources and automatically performs attribute calculations based on the attributes included in the deployment package. In another embodiment, the ATB engine system can calculate the attributes on credit data for a related set of individuals or entities. In one embodiment, both the ATB UI and the ATB engine system are implemented in a component-based architecture with a high degree of flexibility, maintainability, and scalability. In one embodiment, multiple components can be hosted in a single environment. In another embodiment, the components can be distributed across a network with a load balancing server to manage and distribute requests among the components.

FIG. 1 depicts the architecture of an embodiment of the present invention. Attribute Toolbox (ATB) architecture 100 includes two main components: an ATB User Interface (ATB UI) module 102 and an ATB engine system 104. The ATB UI 102 presents a comprehensive user interface through which users can view, edit, validate, and simulate filters and attributes. The ATB engine system 104 takes the attributes created by the ATB UI 102, fetches data from the appropriate data sources, and performs calculations on the fetched data based on those attributes.

ATB UI

As shown in FIG. 1, the ATB UI 102 includes a presentation component 110, a business logic abstraction 112, an attribute/filter management business logic 114, and a data access layer 116.

Attribute Development

The presentation component 110 presents various user interfaces to assist in the development of filters and attributes and the management of their deployment to various systems. In one embodiment, the presentation component 110 further comprises filter and attribute development interfaces 150, a search/browse interface 152, a management interface 154, and a validation interface 156. The filter and attribute development interfaces 150 enable users to drag and drop existing data definitions, filters, functions, and attributes into a coding area and thereby substantially reducing the time and effort required to locate the proper elements that need to be added into new filters and attributes. The search interface 152 enables user to search for and browse filters, attributes, and clients/systems. The management interface 154 allows user to configure clients and systems and provides an interface through which attributes can be associated to systems for deployment. These user interfaces will be further described in conjunction with FIGS. 5A-9B. In one embodiment, the ATB UI 102 accepts requests from client computers 122 and responds by presenting the appropriate user interfaces to the client computers 122.

These user interfaces access objects and methods within the business logic abstraction 112 layer, which is an abstraction layer of the attribute/filter management business logic 114. Hence, any future changes in the implementation in the attribute/filter management business logic 114 will not necessarily necessitate recoding or reconfiguring the presentation component 110. The ATB UI 102 retrieves attributes and filters from the attribute/filter repository 118 through the data access layer 116. Likewise, new or edited filters and attributes are saved back to the repository 118. The attributes can be standardized attributes such as standard aggregation (STAGG) attributes created by Experian, custom-made attributes, or both.

In one embodiment, the repository 118 implements a version control feature so that users of the ATB UI 102 can retrieve previous versions of attributes and filters. Furthermore, the ATB UI 102 provides a locking mechanism by which users can lock the attributes and filters that they are currently editing to prevent other users from changing them. The locking mechanism and the version control feature enable multiple users to collaborate on the development of attributes and filters.

In addition, one embodiment of the ATB UI 102 has user access control. For example, some users may be given rights to execute but not view attributes. Other users may have full rights to view and edit the attributes. In one embodiment, the user access rights are controlled by special serial numbers or passcodes, though it is recognized that a variety of security procedures and methods may be used. A user presents the proper serial number or passcode in order to view and edit attributes. The modularity of various interfaces, in addition to the user control feature of ATB UI 102, allows users with various roles to collaborate on a project. For example, developers of attributes and filters may be granted full rights to view and modify attributes and filters, while business analysts may be granted limited rights to deploy the attributes to various systems. In another example, a company that specializes in developing attributes and filters may have full access rights while its customers who purchase the attributes and filters may be given limited rights to use but not view the attributes and filters.

Testing, Validation and Simulation

Figure 2:
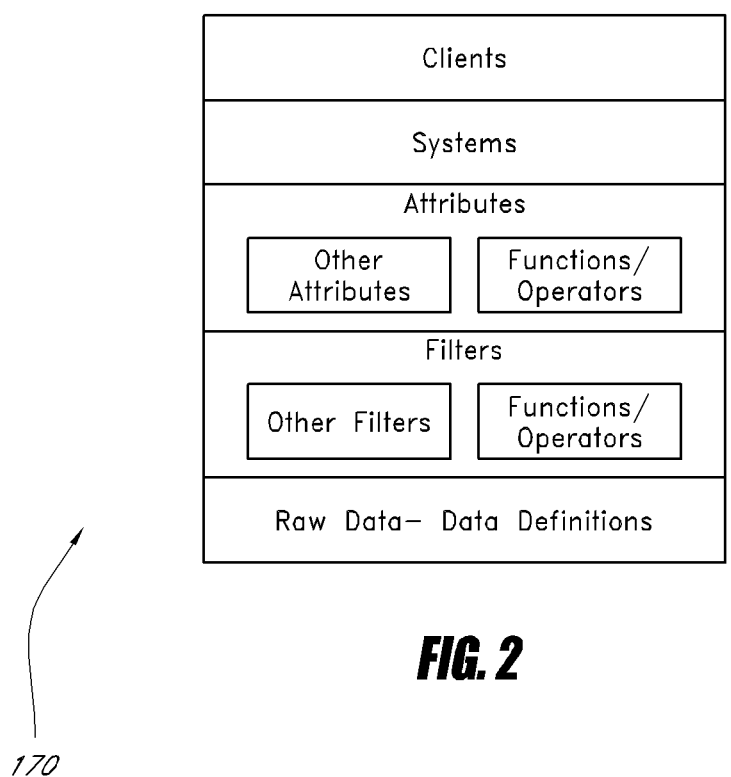
FIG. 2 illustrates the hierarchy and the dependencies of systems, clients, attributes, filters, functions and raw data as used in one embodiment.

One main difficulty with attribute and filter development is the significant effort required for validation. Often attribute and filter developers have to test the attributes and filters on sample data and modify them repeatedly to improve performance and accuracy. In addition to this iterative process, developers have to account for the large number of dependencies that can potentially be in any attributes and filters. FIG. 2 illustrates the potential dependencies as used in one embodiment. Hierarchy 170 shows that clients are dependent on systems, which in turn are dependent on attributes. An example client may be a credit card company, and the company may have a number of systems for its credit card products. For example, one system may be used to screen commercial card applicants and another may be used to screen consumer card applicants. As such, the two systems have different attributes because the screening criteria for these two groups of applicants are different.

Returning to the hierarchy, attributes are further dependent on filters, which in turn are dependent on the raw data definitions. This is because attributes are data-independent and filters are data dependent. In one embodiment, a filter must be defined for each data source. As shown in the hierarchy 170, each filter can also reference other filters, functions and data definitions. Each attribute, in turn, can reference a number of filters, functions and other attributes. Thus, an error in a data definition in a single filter can adversely affect all filters that that reference that single filter, and in turn all attributes that reference those affected filters will be affected as well, and so on.

One embodiment of the ATB UI 102 addresses this difficulty by providing a validation engine 160 that allows for dependency tracing. In one example, an attribute A includes three other attributes B, C, D, and attributes B, C and D each additionally has three filters B1, B2, B3 and so on. When the user decides to test attribute A on a test data set in the validation engine 160, the validation interface 156 shows the user the results of applying filters B1, B2, B3, C1, C2, C3, D1, D2, and D3 to the sample data, as well as the results of calculating attributes B, C, and D. In addition, the validation interface 156 displays the raw data used in testing. Because each result in the chain of dependency for attribute A is displayed, the user can quickly locate any problem within the chain of dependency. For example, the user can see that attribute B is returning undesirable results, determine that filter B1 is incorrect, and adjust filter B1 to correct the problem. Because the dependencies can often be far more numerous and complex than this simple example, the validation interface 156 provides a powerful tracing tool for developers of attributes and filters for multiple data sources.

In addition to the validation engine 160, embodiments also provide a simulation configuration wherein the user can utilize the ATB UI 102 to simulate the performance of their filters and attributes to see how they affect attribute and score calculations. In one embodiment, the ATB UI 102 provides an interface by which a user may connect a custom application so the user may simulate the attributes and filters created in the ATB UI 102 in the custom application.

ATB Viewer

Embodiments of the invention also include an ATB Viewer component. The ATB Viewer is a user interface that allows users to "view" parsed raw data, calculated filter or attribute results. Attributes and filters can be created and generated and the results can be stored. The results can further be returned to a custom/calling application selected by the user. If the user wishes to view the results immediately, he/she can access the ATB Viewer to have a general formatted overview of the results for a specific test case.

Management and Deployment

The ATB UI 102 allows users to manage the collections of filters and attributes that are slated for deployment in the ATB engine system 104. Users can quickly create attributes and associate a group of attributes for deployment. For example, a bank user may create twenty attributes for its credit card operations and another fifty attributes for its home loan operations. The bank may then associate the twenty attributes to a "Credit Cards" system and the fifty attributes to a "Home Loans" systems by using the ATB UI 102. The ATB UI 102 then outputs a deployment package 120 to be used by the ATB UI engine system 104, which performs calculations based on these associated attributes included with the deployment package 120. In one embodiment, the deployment package 120 is generated with the proper dependencies among the attributes and filters. Furthermore, the deployment package 120 can accommodate multiple systems, each with its own associated attributes. This one-step deployment function of this embodiment substantially eliminates the cost of having to code the dependencies of the attributes manually and enables rapid deployment of multiple systems with a single request sent to the ATB UI 102.

ATB Engine System

The ATB engine system 104 retrieves and parses raw data, calculates attributes, and returns results. In the illustrated embodiment, the ATB engine system 104 comprises an ATB engine 106 and a data access engine 108. In other embodiments, they can be combined into one engine. The ATB engine 106 calculates attributes or scores using data received from the data access engine 108. In one embodiment, the ATB engine 106 comprises a parser 162, which reads and parses data. In other embodiments, during calculation, the ATB engine 106 reads instructions in a manually created file or a deployment file produced by the ATB UI 102. The ATB engine 106 then instructs a business rules component 164, which performs the actual calculations.

In one embodiment, the data access engine 108 accesses the external data source(s) 140 or reads the data from one or several files (for example, an automatic response format (ARF) file), parses the data, and sends it to the ATB engine 106 for calculation. The data access engine 108 comprises a mapper 166 and a communication module 168. The mapper 166 handles the mapping of data fields in data sources 140 to objects within ATB engine system 104. The communication module 168 handles the tasks of communicating with various data sources 140. Because data access engine 108 accepts a wide variety of data input, it can be configured to access data from credit data sources 402 as well as data from non-credit data sources 404, such as a local data source 406. In one embodiment, the local data source 406 is a batch XML input. For example, a bank running an instance of the ATB engine 104 may configure the ATB engine 104 to perform attribute calculations on data from a credit bureau, a third-party data source, and/or its own internal customer data. In one embodiment, the results of the calculations are sent to a repository 148 so the calling application 124 may access them.

Because the ATB engine system 104 can handle multiple data sources, it can dynamically calculate the attributes across data sources as needed. Embodiments of the ATB engine system 104 can be configured to automatically calculate attributes across multiple data sources, whether in response to requests from a plurality of calling applications or a large volume of batch requests from batch files. The ability to handle calculations across multiple data sources in accordance to the incoming requests greatly assist in the evaluation of the relative risk/benefit of a given financial decision that involve multiple persons at the same time, such as spouses, partnerships, sole proprietorships, joint ventures, LLCs or other entities. Thus, unlike prior systems, users of the ATB engine system 104 will not have to access the data sources individually and perform attribute calculation for each source and then combine the results of their calculations. Similarly, the ATB engine system 104 will not have to perform an analysis on individuals separately and then combine the results.

Profile

Embodiments of the ATB engine system 104 additionally includes a profile component. In one embodiment the profile component is part of the façade 130. A profile provides the ability to handle simple work flows. For example, one work flow may be a decision of call one data source versus another that depends on the results coming from a previous service request. For example, one profile can include instructions to the ATB engine system 104 to access an alternative data source in case a first request does not return the desired data. The profile workflow logic can include a variety of instructions and requests that can be executed based on the occurrence or non-occurrence of various conditions. Embodiments of ATB engine system include profiles that can handle roll-over logic, ZIP code tables and any other type of logic driven by one or several attribute calculations.

ATB UI Architecture

Figure 3A:
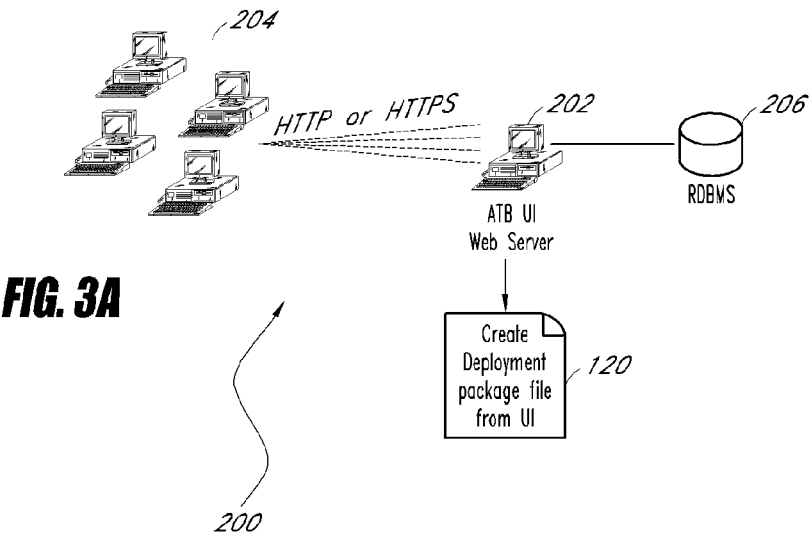
FIG. 3A illustrates an example deployment configuration of the ATB UI according to an embodiment.

FIG. 3A depicts an embodiment of the ATB UI web server architecture. The illustrated ATB UI architecture 200 includes an ATB UI web server 202 configured to receive requests from a plurality of workstations or other remote computing devices 204. In one embodiment, workstations or remote computing devices 204 send requests and receive responses via the HTTP or HTTPS protocols, and use web browsers to solicit inputs and display the information to the end users. For example, an end user may be a bank that regularly extends credit to its customers. The bank may be able to use its computers to remotely interact with the ATB UI web server 202 in order to view, edit, validate, and test its own attributes and filters stored in relational databases 206. In one embodiment, the ATB UI web server 202 is a self-contained Ruby on Rails application that acts as a web server. It communicates via the HTTP or HTTPS protocol in one embodiment. Syntax checking of attribute codes is accomplished through java-script on the client computers. It is recognized that other applications, protocols, and languages may be used.

ATB Engine Architecture

Figure 3B:
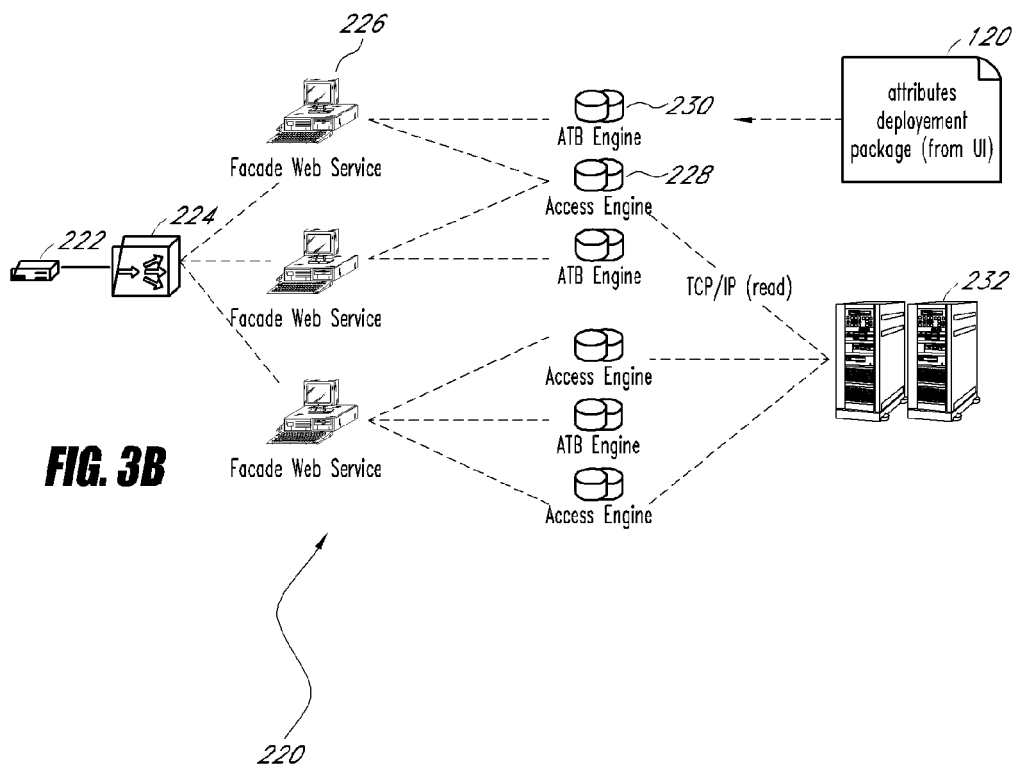
FIG. 3B illustrates an example deployment configuration of the ATB engine system according to an embodiment.

FIG. 3B illustrates an embodiment of the ATB engine system architecture. The illustrated ATB engine system architecture 220 includes a calling application 222, a load balancer 224, one or more façade web services 226, data access engines 228, ATB engines 230, and a data storage 232. In one embodiment, the calling application 222 is an application that sends calculation requests to the load balancer 224. In other embodiments, the calling application 222 directly sends requests to the façade web service 226. These requests include requests to calculate attributes and scores. For example, a bank may have a calling application that sends a request to calculate the number of customers who have the attribute of recently opening a credit line within the last twelve months. In one embodiment, the calling application is a custom-coded application. For example, a mortgage company may have a custom-coded application to process its loan applicants. In another embodiment, the calling application is a commercially available application such as Transact by Experian Decision Analytics. It is recognized that other applications may be used.

In one embodiment, the load balancer 224 receives requests from a plurality of calling applications 222 and distributes those requests to a plurality of the façade web services 226 in order to improve the efficiency of the overall architecture. Each façade web service 226 publishes objects and methods available for attribute calculation. Upon receipt of an incoming request from the calling application 224, the façade web service 226 initiates the appropriate remote procedural calls (RPC) over the TCP/IP protocol to either the data access engine 228 or the ATB engine 230. For example, the façade web service 226 may initiate a first RPC to the data access engine 228 to retrieve the requested data from the data storage 232 and then initiate a second RPC to the ATB engine 230 for calculation. The ATB engine 230 then calculates the results by applying attributes within the deployment package 120 to the retrieved data sets. In one embodiment, a user can use the ATB UI 102 to create the deployment package 120. The final results are sent back to the calling application 222. In the recently opened credit line example mentioned above, the results would be a list of customers who have opened a recent credit line.

The configuration depicted in FIGS. 3A and 3B is for illustrative purposes only and those skilled in the art will recognize that any number of components of the architecture can be used. In one embodiment, the architecture is designed to be scalable. For example, although not depicted, a plurality of calling applications and a plurality of credit bureau data sources can be used in the architecture. Moreover, the components can reside in a single computer environment or distributed across multiple computer environments.

Figure 4A:
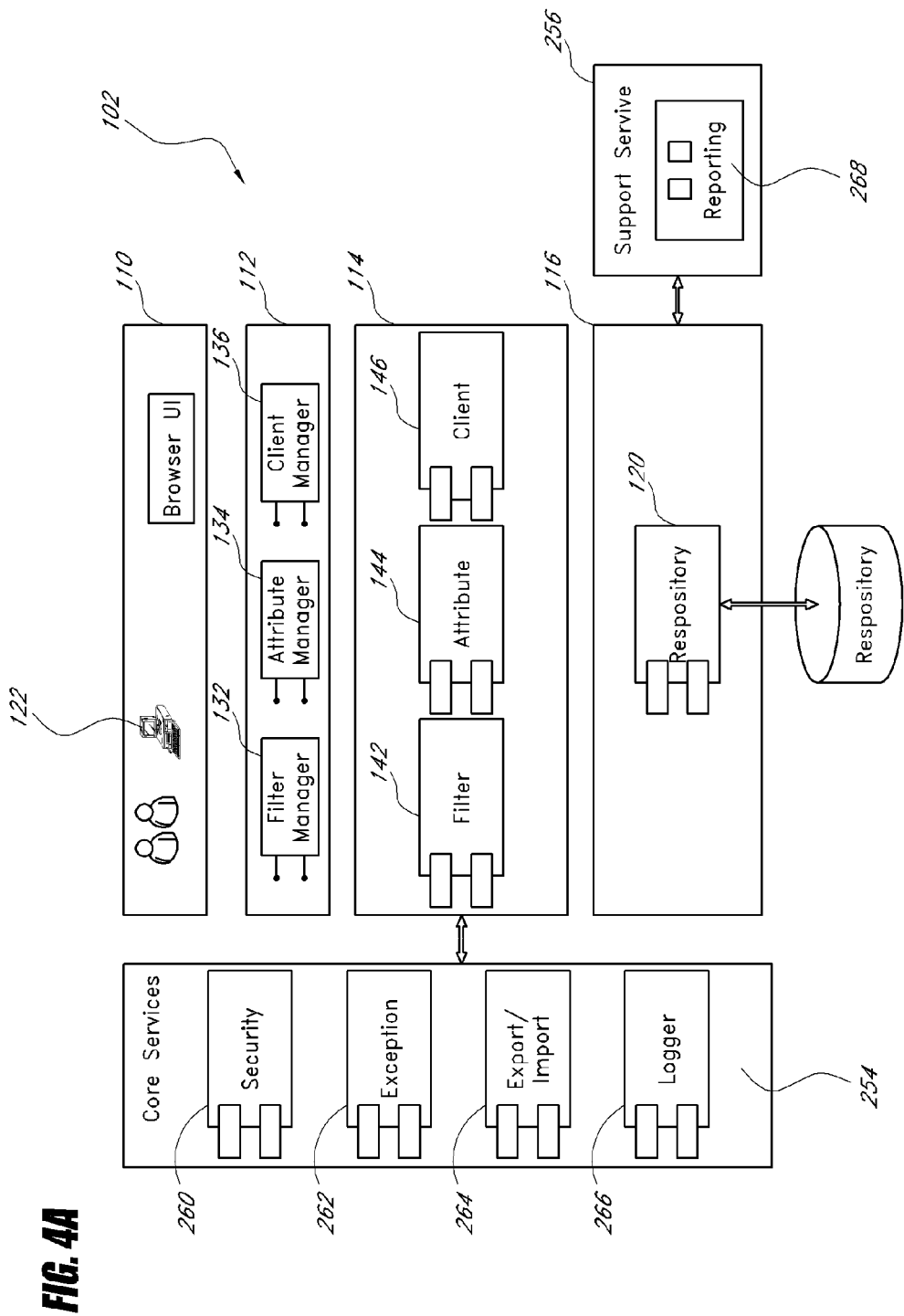
FIG. 4A is a schematic diagram showing the implementation of the ATB UI according to one embodiment.

FIG. 4A provides a more detailed depiction of the architecture of the ATB UI 102 according to one embodiment. As previously shown in FIG. 1, client computers 122 access the ATB UI 102 over one or more communication networks. The presentation component 110 presents a user interface by which users can interact with the ATB UI 102. Except for the web browsers located on client computers 122, no installed code base of ATB UI needs to reside on client computers 122. Communications from the browser interface to the presentation component 110 occur through URL navigation or HTTP requests.

The business logic abstraction layer 112 is an abstraction layer of the attribute/filter management business logic 114.

The abstraction layer 110 further comprises a filter manager 132, an attribute manager 134, and a client manager 136. These managers present objects, systems and methods for viewing, editing, and managing filters, attributes, and systems to which the filters and attributes will employ. The managers have their corresponding counterparts within the business logic 114, namely, a filter business component 142, an attribute business component 144, and a client business component 146. The three business components work with a repository object 120 within the data access layer 116 for transactions involving the repository 118. In this example embodiment, the repository 118 comprises a SQLite database server, but those skilled in the art will recognized that other database servers such as Oracle, mySQL, Microsoft SQL Server, and IBM DB2 can be used as well.

The abstraction layer 112 serves as a liaison between the presentation component 110 and the business logic 114. The abstraction layer 112 also provides security enforcement functions in one embodiment. For example, it ensures that attributes are only displayed for the users who have the proper access rights to view them. In one embodiment, the abstraction layer 112, the business logic 114 and the data access layer 116 are implemented in a Ruby on Rails environment, which has the advantages of providing ease of maintenance and a modular programming construct, though other environments may be used.

As shown in FIG. 4A, the ATB UI 102 further includes a core services component 254 and a support service component 256. In one embodiment, the core services component 254 is a Rails framework comprising a security component 260, an exception component 262, an export/import component 264, and a logger component 266. The security component 260 provides the logic for security enforcement, which limits access to the attributes and filters to those users who have the proper levels of access rights. The exception component 262 handles exceptions generated by any component within the ATB UI 102. The export/import component 264 is a data interchange service that supports and provides the capability to export and import ATB entities (for example, attributes) from and into the ATB UI 102. The logger component 266 is served by the Ruby log4r library in one embodiment. It provides the functionality to publish messages to external log stores and to control the type and volume of data logged. The support service component 256 comprises a reporting component 268, which provides a set of pre-defined reports that can be run. In one embodiment, the generated reports are templates for specification documents and include attributes and related results.

Figure 4B:
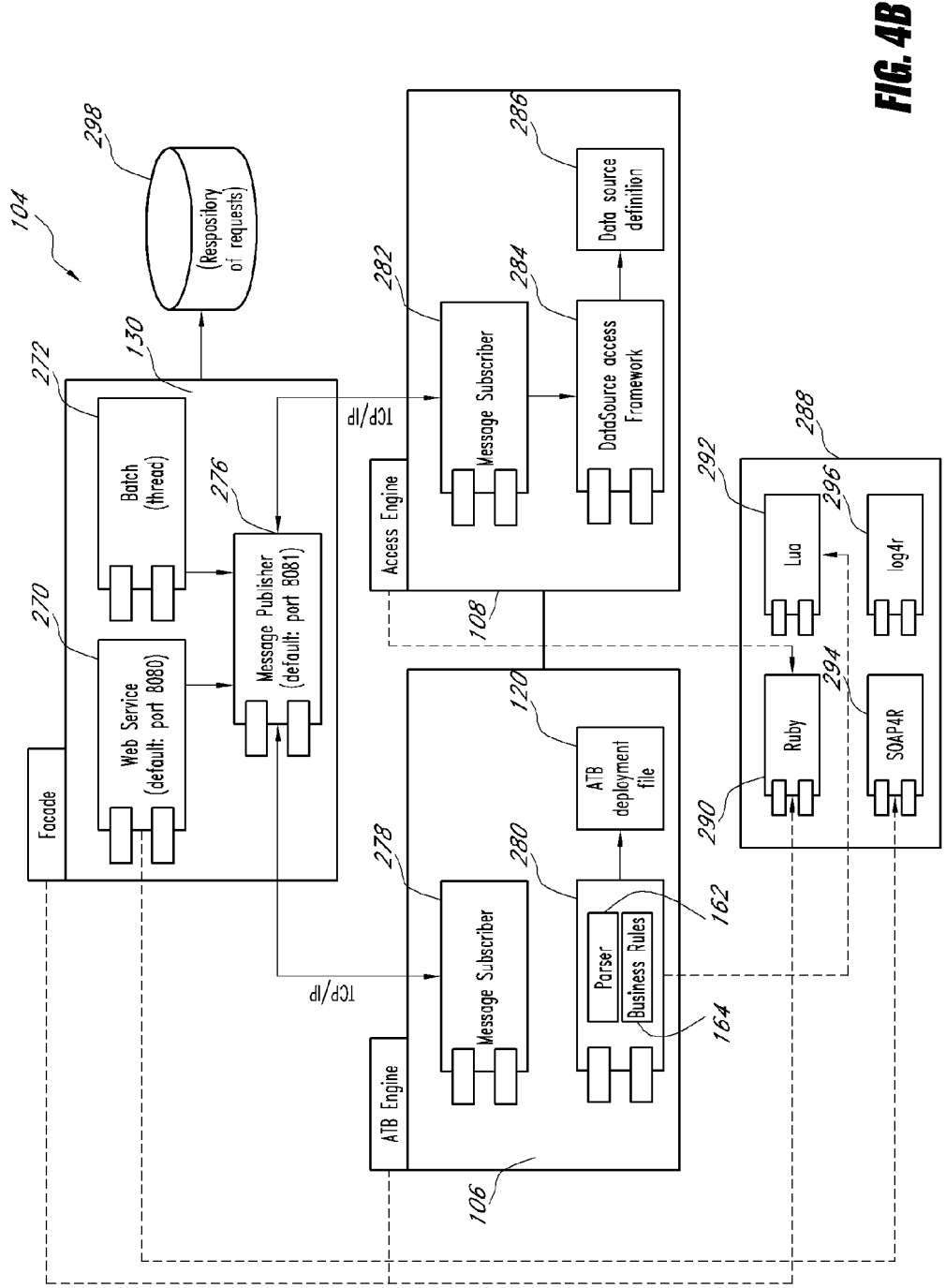
FIG. 4B is a schematic diagram showing the implementation of the ATB engine system according to one embodiment.

FIG. 4B is a schematic diagram showing the implementation of the ATB engine system 104 according to one embodiment. The façade 130 includes two methods of accepting requests. It has a web service component 270 and a batch component 272. In one embodiment, the web service component 270 is supported by a SOAP4R component 294 within technical services 288. SOAP4R is a Simple Object Access Protocol (SOAP) implementation in the Ruby programming language. The web service component 270 thus accepts SOAP requests from calling applications. Alternatively, the batch component 272 reads batched requests in a repository 298. In one embodiment, the repository 298 is a hard drive.

In either case, once an incoming request has been received, the façade 130 begins the process of managing the request and performs the necessary work in order to return a response to the request. First, the façade 130 has a message publisher 276 that will publish a message to either the ATB engine 106 or the data access engine 108. In one embodiment, the message is a RPC sent via the TCP/IP protocol. The façade 130 includes managing logic that will handle the sequence in which RPCs are sent. The façade 130 additionally includes a profile component that handles a variety of work-flow logic as described earlier.

Both the ATB engine 106 and the data access engine 108 have a message subscriber component that subscribes to the message publisher 276. In the ATB engine 106, once the message subscriber 278 receives a message from the message publisher 276, it will instruct business component 280 to perform calculations. In one embodiment, business component 280 further comprises the parser 162 and the business rules component 164. The business rules component 164 performs calculations based on the attributes and filters within deployment package 120, using data parsed by the parser 162. In one embodiment, the business component 280 is implemented in the Lua scripting language, which provides fast execution times and increased performance. This is particularly important in some embodiments because the ATB engine system may be configured to receive a high volume of requests from the batch component 272 and to accept a large number of requests from calling applications through the web service 270. The façade 130 and the access engine 108 are implemented in the Ruby programming language in one embodiment.

Access engine 108 also includes the aforementioned message subscriber 282 and a data source access framework 284. After the message subscriber 282 receives a message from the message publisher 276, it will instruct the data source access framework 284 to access the requested data. The data source access framework reads a data source definition file 286 in order to determine the data formats of the various data sources that are being accessed. Finally, technical services 288 include a log4r component that provides logging capability for debugging purposes.

Attribute Interfaces

FIG. 5A is an example computer screen showing the attribute search/browse interface 152 in the ATB UI 102 according to one embodiment. As shown, a search panel 302 is provided so users can search for attributes by various parameters such as name/keyword, system, and format. In response, the ATB UI 102 displays a sortable list 304 of attributes stored in the repository 118 that match the search parameters. For each attribute, the ATB UI 102 shows the system in which the attribute is being deployed, as well as whether the attribute is locked by another user who is viewing or editing it.

The ATB UI 102 facilitates the management of the attributes and removes some of the difficulties of having to manually configure the deployment of attributes. Because the UI provides a comprehensive view of how attributes are deployed in various systems, users can quickly and easily view the dependencies between attributes and the associated systems and determine how editing an attribute will affect the systems in their deployment scheme. In addition, because the name of each attribute listed is a link to the attribute development interface with that selected attribute shown in a coding area, the users can quickly launch into the development environment from the list 304.

Figure 5B:
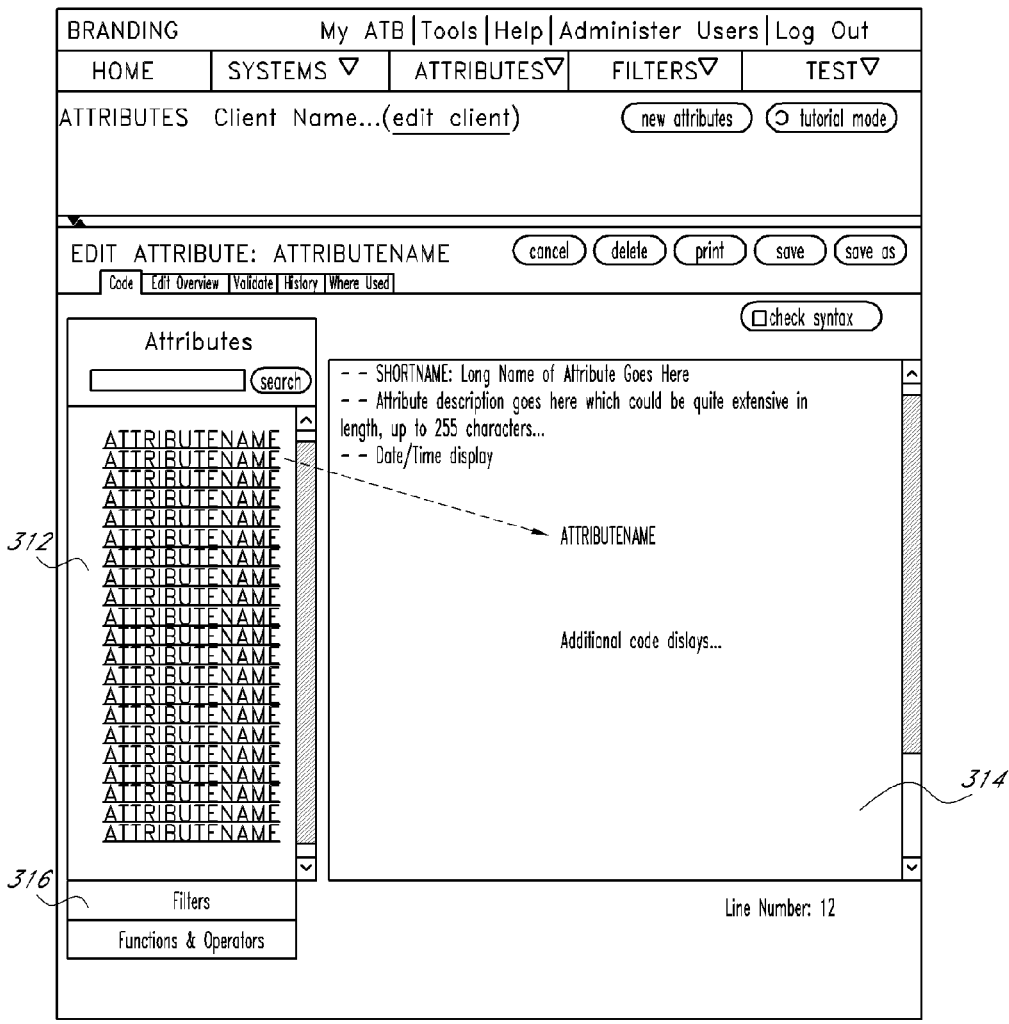
FIG. 5B is an example computer screen showing the attribute development interface according to one embodiment.

FIG. 5B is an example computer screen showing how attributes can be edited in the attribute development interface 150 according to one embodiment. As shown, an example attribute is being edited or created in a coding area 314. Because attributes often reference numerous other attributes, filters, functions, and operators, the development interface 150 provides a panel 312 that lists other attributes, filters, functions, and operators that can be inserted into the coding area 314. This ensures that the newly created attribute or the edited attribute will have the proper dependencies. In one embodiment, the list is populated by the attributes and filters retrieved from the repository 118. Any attribute or filter listed can be moved (for example, dragged and dropped) into the coding area 314, and a proper reference to that attribute or filter automatically appears within the coding area 314.

In addition, the panel 312 has a tab area 316, which has two other tabs "filters" and "functions & operators" as shown. A user can select one of the other tabs and brings up either the filters or the functions and operators that are available. Likewise, these elements can be dragged and dropped into the coding area 314 and the proper references are automatically created. FIG. 5C shows an example of the panel 312 after a user selects the "functions &operators" tab within the tab area 316. Any of the functions and operators shown can be moved (for example, dragged and dropped) into the coding area 314. Therefore, the development interface 150 enables users to rapidly code new attributes or modify existing attributes with accurate references to other attributes, filters, functions, and operators.

Filter Interfaces

Figure 6A:
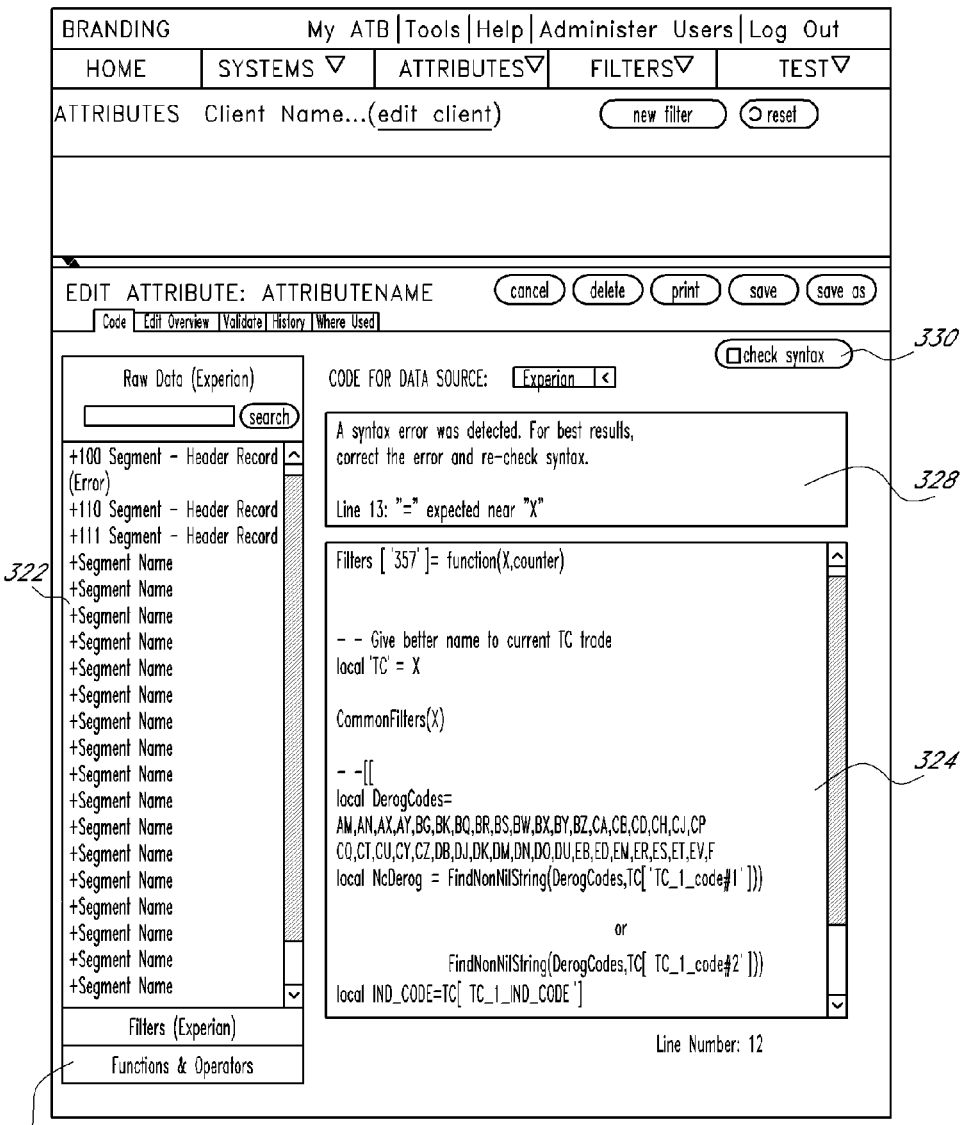
FIG. 6A is an example computer screen showing the filter development interface according to one embodiment.

FIG. 6A is one embodiment of an example computer screen of the filter development interface 150. Similar to the attribute development interface shown in FIG. 5B, the filter development interface presents other filters, functions, and operators in a panel 322 that can be dragged and dropped into a coding area 324.

Coding Filters for Various Data Sources

Because of the complexities of database definitions, the task of developing filters on raw data is often left to programmers. To overcome this problem, the filter development interface 150 simplifies the task of developing filters for various data sources by showing the data fields within segments of the data sources. Therefore, in addition to filters, functions, and operators, the filter development interface has a "raw data" tab in the tab area 326. As shown in FIG. 6A, the available data segments in the data source "Experian" are listed in the panel 322. The fields within the segments are available to be dragged and dropped into the coding area 324. As shown, the coding area 324 shows the codes the filter that is being developed.

Figure 6B:
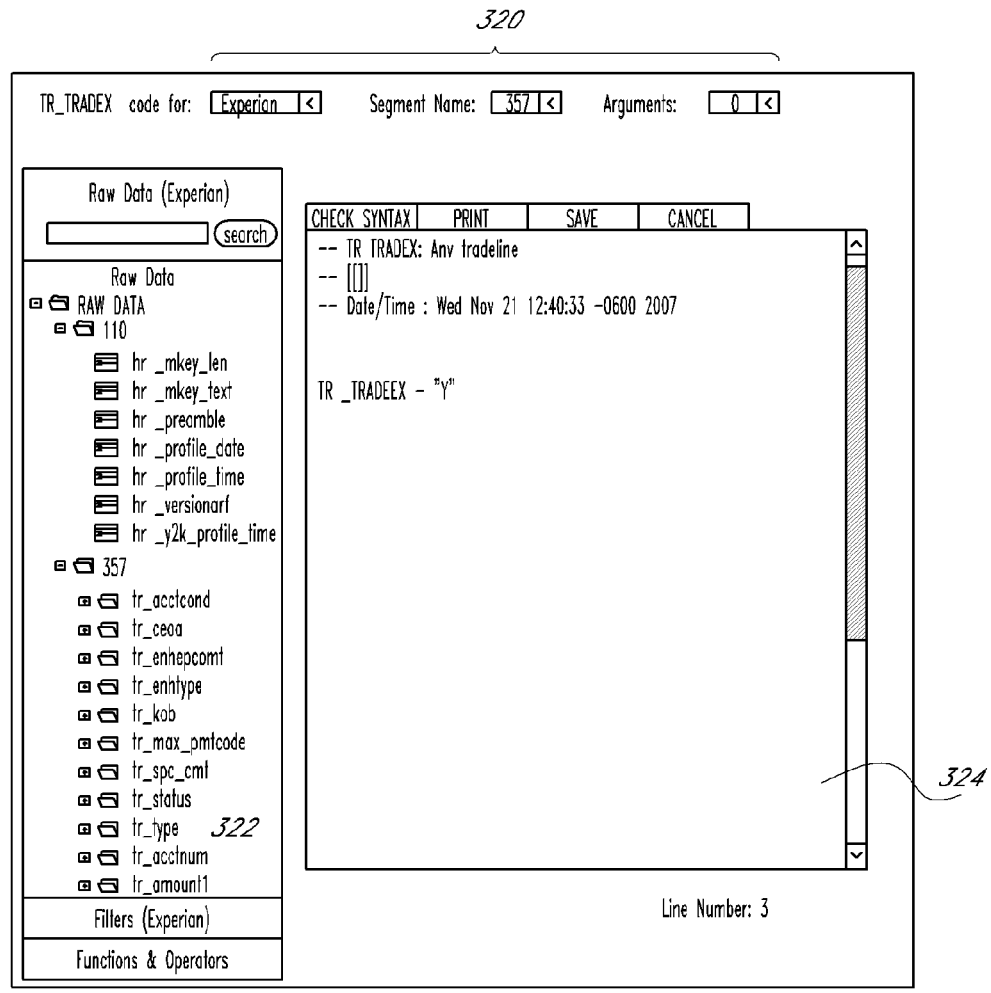
FIG. 6B is an example computer screen showing how details of a selected data source are displayed in the filter development interface according to one embodiment.

FIG. 6B is an example computer screen showing how filters can be developed for different data sources in the ATB UI. As shown in FIG. 6B, data fields for a selected segment within a selected data source are listed in the panel 322. Drop down boxes 320 include a data source drop-down box, a segment drop-down box, and an argument drop-down box. The data source is selected at the data source drop-down box, and the data segment is selected at the segment drop-down box and so on. In this example, the "Experian" data source has been selected and a segment has also been selected. In one embodiment, all available valid segments associated with the selected data source are listed in the segment drop-down box.

In one embodiment, once a segment is selected, all the available data fields are shown within the panel 322. The user can drag and drop a field into the coding area 324. Through the filter development interface 150, a user can easily scan through the available fields within the segments in a data source and quickly and accurately add the necessary fields to a filter that is currently being edited in the coding area 324. This interface minimizes errors and speeds up the development of filters for multiple data sources with different data formats.

FIG. 6C is a computer screen showing the filter search/browse interface 152. Much like the interface shown FIG. 5A for attributes, users can search for filters and the search results will be displayed in a listing 340. Each filter is listed with status information, whether it has been locked by another user for editing, and whether it has been encoded for a particular data source (as indicated by the check marks). Clicking on the name of the filter will launch a development interface similar to the one shown in FIG. 6A, where the user can edit the selected filter.

Syntax Checking and Validation

In one embodiment, ATB UI provides a syntax checking engine that checks the syntax of a filter or an attribute within a current coding area if requested by the user. As shown in FIG. 6A, once the user selects a "Check Syntax" button 330, the ATB UI will run a syntax check on either the filter or attribute that is currently being edited. For example, FIG. 6A shows the syntax check window 328 displaying a message indicating that the syntax check engine has discovered a syntax error on line 13 of the example filter. The syntax check engine can likewise check for syntax errors within an attribute. Thus users of the ATB UI can avoid saving invalid filters or attributes. In other embodiments, a syntax check is automatically performed when a user attempts to save a filter or an attribute to the repository 118, or save changes to an existing filter or attribute.

Besides a syntax checking engine, embodiments of ATB UI also provide the validation interface 156 and the validation engine 160 (shown in FIG. 1) through which users can validate attributes against test data. FIG. 7 shows an example computer screen of the validation interface 156. The validation interface 156 includes an information/selection area 350, which further includes a data file selector 352 and a data source selector 354. Using the data file selector 354, the user can select a sample test file including test data for the data source that the user selects in the data source selector 354. In the example shown, the user has selected a file including sample data from the data source "Experian" to be sent to the validation engine 160. In one embodiment, the validation engine 160 accepts test files for in the ARF format.

In the example shown in FIG. 7, the validation engine 160, through the validation interface 156, provides a result 358 for the selected attribute "ALL002." The validation engine 160 has calculated the attribute "ALL002" against the test data and has determined that the result is 52.0. More importantly, the validation interface 156 further includes a validation table 356 in which a user can examine the raw data and the dependencies within the attribute that is undergoing validation. The column headings of the validation table 356 show all the depending filters and attributes referenced in the code of attribute "ALL002." The rows of the validation table 356 show raw data from the test file.

The validation interface 156 advantageously allows the user to see exact results returned by each filter or attribute referenced by the attribute that is being validated. This enables the user to quickly determining any errors or performance problems hidden in the chain of dependencies. The user can, for example, quickly determine that a filter is selecting a wrong field or that an attribute calculation is returning erroneous or undesirable results. The validation interface 156 is particularly helpful in the development of aggregation attributes, which often reference a large number attributes and filters.

System Management

FIG. 8A is one embodiment of an example computer screen showing how a client can be created in the ATB UI.

An input interface 360 solicits configuration information that is needed to create a new client. The input interface 360 includes a listing of data sources that the new client will access, as well as a listing of systems that will be associated with this new client. When the user attempts to save the client configuration information, the ATB UI will check for errors and display an error message 362 (as shown) if needed.

Figure 8B:
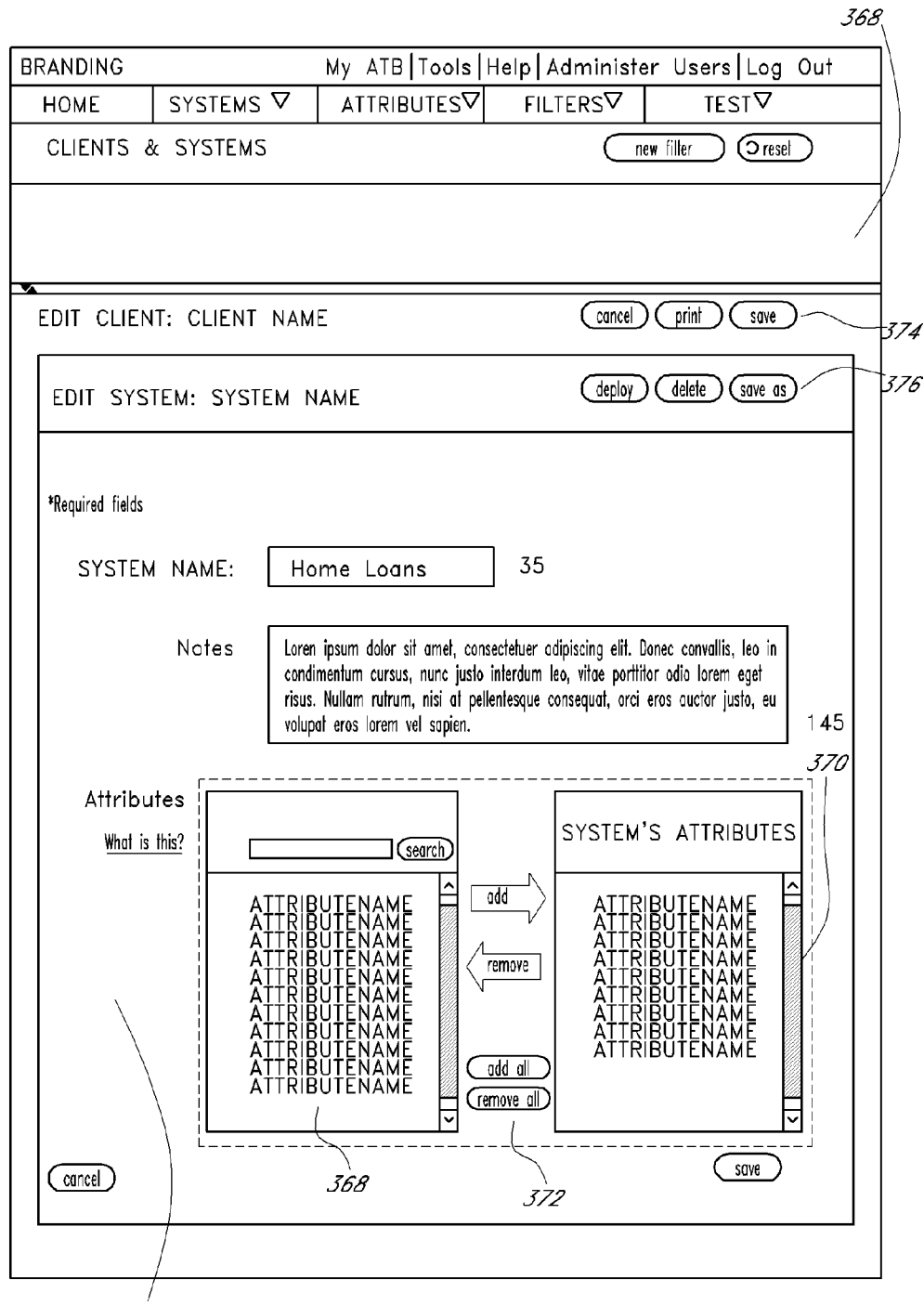
FIG. 8B is an example computer screen showing how attributes can be associated with a client system for deployment according to one embodiment.

FIG. 8B is one embodiment of an example computer screen showing how attributes can be associated with a client system for deployment. As an example, a client who is a bank may wish to deploy various systems associated with its needs. The bank may thus have one system that screens potential home loan applicants and another system for finding prospective commercial credit card applicants. Because each system requires different data and calculations, the bank client may wish to configure each one differently. The ATB UI provides an interface 366 to allow a client user to associate various attributes to a system for deployment. The interface 366 includes an available attribute listing 368 and a deployment attribute listing 370. The user can search for and browse attributes that are available deployment in the listing 368 and then add the attributes to the deployment listing 370 by using an arrow selector 372. The attributes will then be slated for deployment for the particular system.

FIG. 8C is one embodiment of an example computer screen showing how multiple client system deployments are managed in the ATB UI. A system listing 380 lists systems that are available for deployment. Each system is listed with a name, a historical data entry including the date of last deployment, status, and the number of associated attributes. Under the status column, the ATB UI may indicate whether a system is ready or not ready for deployment. Some systems may not be ready to be deployed because they may have attributes with syntax errors or no attributes at all. The system listing 380 provides a way for the user to browse through the available systems and quickly determine which are ready for deployment. Furthermore, the ATB UI provides a link to the attributes so the user can quickly view or edit the attributes associated with the systems. The user is also given the option to select multiple systems from the listing 380 and deploy all of them at the same time. The deployment package 120 is then automatically created and can be used in ATB engine system 104.

Managing Data Sources and Attribute Exports

FIG. 9A is one embodiment of an example computer screen showing how multiple data sources are managed in the ATB UI 102. The ATB UI 102 provides a data source listing 386 that lists the available data sources. Each entry lists the short and long names of the data source as well as the time when the data source was last modified. The ATB UI 102 also provides a data source area 388 that displays the detail information of a data source that has been selected. The user can then view or edit the details of a particular data source, including the location of the file from which data can be obtained.

FIG. 9B is one embodiment of an example computer screen shot showing how attributes can be exported to a file. A system listing 390 provides a listing of systems that can be exported. Once exported, the file will include all attributes associated with the selected system. The export function allows multiple users from various sites to collaborate on a project. In one embodiment, users at remote sites without access to the centralized repository can run their own copies of the ATB UI 102. For example, a first user may be developing attributes and filters on a laptop while traveling. The export function enables the first user to export the attributes and filters and send the export file to a second user who runs a different instance of the ATB UI 102 that has a connection to a centralized repository. The second user will then be able to import the attributes created by the first user and save the attributes to the centralized repository. In one embodiment, the ATB UI 102 checks the import file against the repository, so that duplicate attributes are shown to the user. The second user will then have the option of overwriting the attributes that are in the repository with the imported version. In this manner, numerous users from various remote locations, even those without connection to a centralized attribute repository, can independently develop attributes and filters and merge their work later.

Various Embodiments of System and Method Implementations

In one embodiment, the systems and methods for generating and calculating attributes may be embodied in part or in whole in software that is running on one or more computing devices. The functionality provided for in the components and modules of the computing device(s) may comprise one or more components and/or modules. For example, the computing device(s) may comprise multiple central processing units (CPUs) and one or more mass storage device(s), such as may be implemented in an array of servers.

In general, the word "module," "application", or "engine," as used herein, refers to logic embodied in hardware and/or firmware, and/or to a collection of software instructions, possibly having entry and exit points, written in a programming language, such as, for example, Java, Ruby, Ruby on Rails, Lua, C and/or C++. These may be compiled and linked into an executable program, installed in a dynamic link library, or may be written in an interpreted programming language such as, for example, BASIC, Perl, or Python. It will be appreciated that modules, applications, and engines may be callable from others and/or from themselves, and/or may be invoked in response to detected events or interrupts. Instructions may be embedded in firmware, such as an EPROM.

It will be further appreciated that hardware may be comprised of connected logic units, such as gates and flip-flops, and/or may be comprised of programmable units, such as programmable gate arrays or processors. The modules, applications, and engines described herein are in certain applications preferably implemented as software modules, but may be represented in hardware or firmware in other implementations. Generally, the modules, applications, and engines described herein refer to logical modules that may be combined with other modules and/or divided into sub-modules despite their physical organization or storage.

In some embodiments, the computing device(s) communicates with one or more databases that store information, including credit data and/or non-credit data. This database or databases may be implemented using a relational database, such as SQLite, Sybase, Oracle, CodeBase, mySQL, and Microsoft® SQL Server as well as other types of databases such as, for example, a flat file database, an entity-relationship database, and object-oriented database, and/or a record-based database.

In one embodiment, the computing device is IBM, Macintosh, and/or Linux/Unix compatible. In another embodiment, the computing device comprises a server, a laptop computer, a cell phone, a Blackberry, a personal digital assistant, a kiosk, or an audio player, for example. In one embodiment, the computing device includes one or more CPUs, which may each include microprocessors. The computing device may further include one or more memory devices, such as random access memory (RAM) for temporary storage of information and read only memory (ROM) for permanent storage of information, and one or more mass storage devices, such as hard drives, diskettes, or optical media storage devices. In one embodiment, the modules of the computing are in communication via a standards based bus system, such as bus systems using Peripheral Component Interconnect (PCI), Microchannel, SCSI, Industrial Standard Architecture (ISA) and Extended ISA (EISA) architectures, for example. In certain embodiments, components of the computing device communicate via a network, such as a local area network that may be secured.

The computing is generally controlled and coordinated by operating system software, such as the Windows 95, Windows 98, Windows NT, Windows 2000, Windows XP, Windows Vista, Linux, SunOS, Solaris, PalmOS, Blackberry OS, or other compatible operating systems. In Macintosh systems, the operating system may be any available operating system, such as MAC OS X. In other embodiments, the computing device may be controlled by a proprietary operating system. Conventional operating systems control and schedule computer processes for execution, perform memory management, provide file system, networking, and I/O services, and provide a user interface, such as a graphical user interface (GUI), among other things.

The computing device may include one or more commonly available input/output (I/O) devices and interfaces, such as a keyboard, mouse, touchpad, microphone, and printer. Thus, in one embodiment the computing device may be controlled using the keyboard and mouse input devices, while in another embodiment the user may provide voice commands to the computing device via a microphone. In one embodiment, the I/O devices and interfaces include one or more display device, such as a monitor, that allows the visual presentation of data to a user. More particularly, a display device provides for the presentation of GUIs, application software data, and multimedia presentations, for example. The computing device may also include one or more multimedia devices, such as speakers, video cards, graphics accelerators, and microphones, for example.

In one embodiment, the I/O devices and interfaces provide a communication interface to various external devices. For example, the computing device may be configured to communicate with one or more networks, such as any combination of one or more LANs, WANs, or the Internet, for example, via a wired, wireless, or combination of wired and wireless, communication links. The network communicates with various computing devices and/or other electronic devices via wired or wireless communication links.

Although the foregoing invention has been described in terms of certain embodiments, other embodiments will be apparent to those of ordinary skill in the art from the disclosure herein. Moreover, the described embodiments have been presented by way of example only, and are not intended to limit the scope of the inventions. Indeed, the novel methods and systems described herein may be embodied in a variety of other forms without departing from the spirit thereof. Accordingly, other combinations, omissions, substitutions and modifications will be apparent to the skilled artisan in view of the disclosure herein. For purposes of discussing the invention, certain aspects, advantages and novel features of the invention have been described herein. Of course, it is to be understood that not necessarily all such aspects, advantages or features will be embodied in any particular embodiment of the invention.

What is claimed is:

1. A computer-implemented method for validating and calculating scores based on data from multiple data sources, comprising:
   selecting a plurality of data sets from a plurality of data sources, wherein each of the plurality of data sources stores its data in a specific format distinct from the other data sources in the plurality of data sources;
   defining a plurality of sets of filters, wherein each set of filters is associated with the specific format of each of the plurality of data sources;
   defining definitions for a plurality of data source-independent attributes, wherein a definition for a data source-independent attribute of the plurality of data source-independent attributes comprises (a) a plurality of dependencies between the data source-independent attribute and a plurality of filters selected from at least a first set of filters and a second set of filters from the plurality of sets of filters, and (b) at least one reference between the data source-independent attribute and at least one reference function;
   validating the definition for the data source-independent attribute via a validation user interface configured to display information in a format that allows identification of errors in one or more of the filters in the first and second sets of filters, the validating comprising:
      selecting a first data source associated with millions of consumers from the plurality of data sources, the data source comprising a plurality of credit data lines related to the consumers, each credit line comprising at least a first raw data value of a first raw data and a second raw data value of a second raw data;
      selecting a first filter in the first set of filters based upon a dependency between the data source-independent attribute and the first filter, wherein the first filter is associated with the specific format of the first selected data source;
      applying the first filter to the first raw data value to generate at least one first filter value;
      selecting a second data source associated with millions of consumers and selecting a second filter in the second set of filters based upon a dependency between the data source-independent attribute and the second filter, wherein the second filter is associated with the specific format of the second selected data source;
      applying the second filter to the second raw data value to generate at least one second filter value;
      calculating a credit data attribute value for the data source-independent attribute by applying the at least one function reference to one or more of the at least one first filter value, the at least one second filter value, or one or more raw data values;
      displaying, for each credit data line, via the validation user interface, the at least one first filter value, the at least one second filter value, the first raw data value, and the second raw data value;
      displaying, via the validation user interface, the credit data attribute value in association with a name of the data source independent attribute;
      identifying a coding error in the first filter, the second filter, or the at least one reference function;

receiving a revised definition for the data source-independent attribute, comprising at least one edit to the first filter, the second filter, or the at least one reference function;

associating the plurality of data source-independent attributes with at least one deployment group;

generating a deployment package based on a deployment group of the at least one deployment group, wherein the deployment package includes computer instructions; and deploying the deployment package to an attribute engine, wherein the attribute engine is configured to access at least a portion of the plurality of data sources to generate attribute values based upon one or more computer instructions included within the deployment package.

2. The method of claim 1 wherein the attribute engine is configured to select the plurality of data sets from the plurality of data sources using the plurality of filters and calculate attributes in the deployment package on the selected data sets.

3. The method of claim 2 wherein the attributes in the deployment package are attributes for a related set of individuals.

4. The method of claim 1, wherein the plurality of data sources comprises at least fifteen data sources.

5. The method of claim 1, wherein defining definitions for the plurality of data source-independent attributes comprises locking a first source-independent attribute of the plurality of data source-independent attributes while editing the first source-independent attribute of the plurality of data source-independent attribute, the locking preventing a second user from editing the first source-independent attribute.

6. The method of claim 1, further comprising displaying, via the validation user interface, raw credit data of at least thirteen credit data lines of the plurality of credit data lines.

7. The method of claim 1, wherein defining the plurality of sets of filters, comprises concurrently displaying, with a filter from the plurality of filters, via a coding user interface, a set of data fields from the plurality of data sources, each data field from the set of data fields being selectable to be inserted, via the coding user interface, into a filter formula.

8. A system for validating and calculating scores based on data from multiple data sources, the system comprising:
one or more physical processors; and
non-transitory computer storage comprising code executable by the one or more physical processors, the executable code causing the one or more processors to, when executed:
select a plurality of data sets from a plurality of data sources, wherein each of the plurality of data sources stores its data in a specific format distinct from the other data sources in the plurality of data sources;
define a plurality of sets of filters, wherein each set of filters is associated with the specific format of each of the plurality of data sources;
define definitions for a plurality of data source-independent attributes, wherein a definition for a data source-independent attribute of the plurality of data source-independent attributes comprises (a) a plurality of dependencies between the data source-independent attribute and a plurality of filters selected from at least a first set of filters and a second set of filters from the plurality of sets of filters, and (b) at least one reference between the data source-independent attribute and at least one reference function;

validate the definition for the data source-independent attribute via a validation user interface configured to display information in a format that allows identification of errors in one or more of the filters in the first and second sets of filters, wherein causing the one or more processors to validate the definition comprises causing the one or more processors to:
select a first data source associated with a consumer from the plurality of data sources, the data source comprising a plurality of credit data lines related to the consumer, each credit line comprising at least a first raw data value of a first raw data and a second raw data value of a second raw data;
select a first filter in the first set of filters based upon a dependency between the data source-independent attribute and the first filter, wherein the first filter is associated with the specific format of the selected first data source;
apply the first filter to the first raw data value to generate at least one first filter value;
select a second source associated with the consumers and select a second filter in the second set of filters based upon a dependency between the data source-independent attribute and the second filter, wherein the second filter is associated with the specific format of the selected second data source;
apply the second filter to the second raw data value to generate at least one second filter value;
calculate a credit data attribute value for the data source-independent attribute by applying the at least one function reference to one or more of the first filter value, the second filter value, or one or more raw data values;
display, for each credit data line, via the validation user interface, the at least one first filter value, the at least one second filter value, the first raw data value, and the second raw data value;
display, via the validation user interface, the credit data attribute value in association with a name of the data source independent attribute;
identify a coding error in the first filter, the second filter, or the at least one reference function;
receive a revised definition for the data source-independent attribute, comprising at least one edit to the first filter, the second filter, or the at least one reference function;
associate the plurality of data source-independent attributes to at least one deployment group;
generate a deployment package based on a deployment group of the at least one deployment group; and
deploy the deployment package to an attribute engine, wherein the attribute engine is configured to generate attribute values based upon one or more computer instructions included within the deployment package.

9. The system of claim 8 wherein the attribute engine is configured to select the plurality of data sets from the plurality of data sources using the plurality of filters and calculate attributes in the deployment package on the selected data sets.

10. The system of claim 9 wherein the attributes in the deployment package are attributes for a related set of individuals.

11. The system of claim 8, wherein the plurality of data sources comprises at least 15 data sources.

12. The system of claim 8, wherein defining definitions for the plurality of data source-independent attributes comprises locking a first source-independent attribute of the plurality of data source-independent attributes while editing the first source-independent attribute of the plurality of data source-independent attribute, the locking preventing a second user from editing the first source-independent attribute.

13. The system of claim 8, further comprising displaying, via the validation user interface, raw credit data of at least thirteen credit data lines of the plurality of credit data lines.

14. The system of claim 8, wherein defining the plurality of sets of filters, comprises concurrently displaying, with a filter from the plurality of filters, via a coding user interface, a set of data fields from the plurality of data sources, each data field from the set of data fields being selectable to be inserted, via the coding user interface, into a filter formula.

15. A non-transitory computer storage medium which stores a client application comprising executable code, the executable code, when executed by the computing device, causing the computing device to perform operations comprising:

selecting a plurality of data sets from a plurality of data sources, wherein each of the plurality of data sources stores its data in a specific format distinct from the other data sources in the plurality of data sources;

defining a plurality of sets of filters, wherein each set of filters is associated with the specific format of each of the plurality of data sources;

defining definitions for a plurality of data source-independent attributes, wherein a definition for a data source-independent attribute of the plurality of data source-independent attributes comprises (a) a plurality of dependencies between the data source-independent attribute and a plurality of filters selected from at least a first set of filters and a second set of filters from the plurality of sets of filters, and (b) at least one reference between the data source-independent attribute and at least one reference function;

validating the definition for the data source-independent attribute via a validation user interface configured to display information in a format that allows identification of errors in one or more of the filters in the first and second sets of filters, the validating comprising:

selecting a data source associated with a consumer from the plurality of data sources, the data source comprising a plurality of credit data lines related to the consumer, each credit line comprising at least a first raw data value of a first raw data and a second raw data value of a second raw data;

selecting a first filter in the first set of filters based upon a dependency between the data source-independent attribute and the first filter, wherein the first filter is associated with the specific format of the selected data source;

applying the first filter to the first raw data value to generate at least one first filter value;

selecting a second filter in the second set of filters based upon a dependency between the data source-independent attribute and the second filter, wherein the second filter is associated with the specific format of the selected data source;

applying the second filter to the second raw data value to generate at least one second filter value;

calculating a credit data attribute value for the data source-independent attribute by applying the at least one function reference to one or more of the at least one first filter value, the at least one second filter value, or one or more raw data values;

displaying, for each credit data line, via the validation user interface, the at least one first filter value, the at least one second filter value, the first raw data value, and the second raw data value;

displaying, via the validation user interface, the credit data attribute value in association with a name of the data source independent attribute;

identifying a coding error in the first filter, the second filter, or the at least one reference function;

receiving a revised definition for the data source-independent attribute, comprising at least one edit to the first filter, the second filter, or the at least one reference function;

associating the plurality of data source-independent attributes to at least one deployment group;

generating a deployment package based on a deployment group of the at least one deployment group; and deploying the deployment package to an attribute engine, wherein the attribute engine is configured to generate attribute values based upon one or more computer instructions included within the deployment package.

16. The non-transitory computer storage medium of claim 15 wherein the attribute calculation engine is configured to select the plurality of data sets from the plurality of data sources using the plurality of filters and calculate attributes in the deployment package on the selected data sets.

17. The non-transitory computer storage medium of claim 16, wherein the attributes in the deployment package are attributes for a related set of individuals.

18. The non-transitory computer storage medium of claim 15, wherein the plurality of data sources comprises at least 15 data sources.

19. The non-transitory computer storage medium of claim 15, wherein defining definitions for the plurality of data source-independent attributes comprises locking a first source-independent attribute of the plurality of data source-independent attributes while editing the first source-independent attribute of the plurality of data source-independent attribute, the locking preventing a second user from editing the first source-independent attribute.

20. The non-transitory computer storage medium of claim 15, wherein defining the plurality of sets of filters, comprises concurrently displaying, with a filter from the plurality of filters, via a coding user interface, a set of data fields from the plurality of data sources, each data field from the set of data fields being selectable to be inserted, via the coding user interface, into a filter formula.

* * * * *